United States Patent
Mao et al.

(10) Patent No.: US 11,901,760 B2
(45) Date of Patent: Feb. 13, 2024

(54) RECEIVE END AND TRANSMIT END OF WIRELESS CHARGING SYSTEM, METHOD, ELECTRICAL TERMINAL, AND SYSTEM

(71) Applicant: HUAWEI TECHNOLOGIES CO., LTD., Guangdong (CN)

(72) Inventors: Yunhe Mao, Shenzhen (CN); Yanding Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 17/226,860

(22) Filed: Apr. 9, 2021

(65) Prior Publication Data

US 2021/0226473 A1    Jul. 22, 2021

Related U.S. Application Data

(63) Continuation of application No. PCT/CN2019/110545, filed on Oct. 11, 2019.

(30) Foreign Application Priority Data

Dec. 6, 2018 (CN) .......................... 201811488672.6

(51) Int. Cl.
*H02J 7/02* (2016.01)
*H02J 50/12* (2016.01)
(Continued)

(52) U.S. Cl.
CPC ................ *H02J 7/02* (2013.01); *H02J 50/12* (2016.02); *H02M 1/0058* (2021.05); *H02M 7/219* (2013.01)

(58) Field of Classification Search
USPC ....................................................... 320/108
See application file for complete search history.

(56) References Cited

U.S. PATENT DOCUMENTS

2014/0372780 A1* 12/2014 Murai ................... G06F 1/3287
                                                        713/323
2015/0303703 A1* 10/2015 Hayashi .................... H02J 7/02
                                                        307/104

(Continued)

FOREIGN PATENT DOCUMENTS

CN          103219892 A       7/2013
CN          103814503 A       5/2014
(Continued)

OTHER PUBLICATIONS

Extended European Search Report issued in European Application No. 19892638.8 on Sep. 24, 2021, 9 pages.

(Continued)

*Primary Examiner* — Mohammed Alam
(74) *Attorney, Agent, or Firm* — Fish & Richardson P.C.

(57) ABSTRACT

Example wireless charging systems and methods are disclosed. One example system includes a receive end and a transmit end. The receive end includes a receive coil, a receive end compensation circuit, a rectifier, and a controller. The controller adjusts a phase difference between a first bridge arm and a second bridge arm of the rectifier, and adjusts a phase-shift angle between a bridge arm voltage of the rectifier and a fundamental component of an input current of the rectifier, so that zero-voltage switching is implemented for controllable switching transistors of the rectifier. An inductance compensation module may weaken a capacitive part of the equivalent impedance, and reduce reactive power of the wireless charging system.

20 Claims, 18 Drawing Sheets

(51) Int. Cl.
*H02M 1/00* (2006.01)
*H02M 7/219* (2006.01)

(56) References Cited

U.S. PATENT DOCUMENTS

| | | | | |
|---|---|---|---|---|
| 2016/0352152 | A1* | 12/2016 | Karalis | H02J 50/60 |
| 2017/0361723 | A1* | 12/2017 | Elshaer | B60L 53/126 |
| 2018/0233953 | A1* | 8/2018 | Thrimawithana | H02J 50/402 |
| 2019/0097471 | A1* | 3/2019 | Pantic | H02J 50/12 |
| 2021/0226473 | A1* | 7/2021 | Mao | H02J 3/18 |
| 2022/0250487 | A1* | 8/2022 | Mao | H02J 7/02 |

FOREIGN PATENT DOCUMENTS

| | | |
|---|---|---|
| CN | 103843229 A | 6/2014 |
| CN | 106374529 A | 2/2017 |
| CN | 106961221 A | 7/2017 |
| CN | 107069999 A | 8/2017 |
| CN | 107979298 A | 5/2018 |
| CN | 109327065 A | 2/2019 |
| WO | 2017105256 A1 | 6/2017 |
| WO | 2017136491 A1 | 8/2017 |

OTHER PUBLICATIONS

Kainan et al., "Analysis of Resonant Topology for Bi-directional Wireless Charging of Electric Vehicle," Automation of Electric Power Systems, vol. 41, No. 2, Jan. 2017, 7 pages (with English translation).

Office Action issued in Chinese Application No. 201811488672.6 on Oct. 14, 2019, 9 pages (with English translation).

PCT International Search Report and Written Opinion issued in International Application No. PCT/CN2019/110545 on Jan. 9, 2020, 21 pages (with English translation).

Thrimawithana et al., "A Synchronization Technique for Bidirectional IPT Systems," IEEE Transactions On Industrial Electronics, vol. 60, No. 1, Jan. 2013, 9 pages.

* cited by examiner

RECEIVE END AND TRANSMIT END OF WIRELESS CHARGING SYSTEM, METHOD, ELECTRICAL TERMINAL, AND SYSTEM

CROSS-REFERENCE TO RELATED APPLICATIONS

This application is a continuation of International Application No. PCT/CN2019/110545, filed on Oct. 11, 2019, which claims priority to Chinese Patent Application No. 201811488672.6, filed on Dec. 6, 2018. The disclosures of the aforementioned applications are hereby incorporated by reference in their entireties.

TECHNICAL FIELD

The present invention relates to the field of power electronics technologies, and in particular, to a receive end and a transmit end of a wireless charging system, a method, an electrical terminal, and a system.

BACKGROUND

With aggravation of energy shortage and environmental pollution issues in modern society, as new energy vehicles, electric automobiles have aroused wide concerns from all walks of life once launched. However, restricted by battery capacities, driving distances of most existing electric automobiles are relatively short. In addition, it takes a long time to charge a battery of an electric automobile, and corresponding charging station resources are insufficient. These factors become bottlenecks for application and popularization of electric automobiles.

Methods for charging a battery of an electric automobile usually include contact charging and wireless charging. For contact charging, metallic contact between a plug and a socket is used to conduct electricity. For wireless charging, a coupled electromagnetic field is used as a medium for implementing transfer of electrical energy. Compared with contact charging, wireless charging has many advantages, and therefore will become a mainstream charging mode of electric automobiles in the future.

An output power of a wireless charging system needs to be adjusted during work of the wireless charging system. This is also referred to as impedance adjustment. The output power of the wireless charging system depends on an output power of a rectifier, and a value of the output power of the rectifier depends on an equivalent impedance of the rectifier. Therefore, the output power of the wireless charging system is usually adjusted by adjusting the equivalent impedance of the rectifier. The equivalent impedance of the rectifier is equal to a value obtained by dividing a bridge arm voltage of the rectifier by an input current of the rectifier. In view of this, the equivalent impedance of the rectifier can be adjusted by controlling the bridge arm voltage and the input current of the rectifier.

Controllable switching transistors are usually used in the rectifier, and implementing a zero-voltage switching (ZVS) effect for the controllable switching transistors can greatly reduce switching losses of the controllable switching transistors, thereby prolonging a lifespan of a component. The ZVS means that when a controllable switching transistor is turned on and turned off, an ideal value of a voltage at two ends of the controllable switching transistor is 0. Certainly, during actual application, the voltage at the two ends may be a relatively low voltage. A lower voltage indicates lower power consumption. However, in the existing technology, when the zero-voltage switching is implemented for the controllable switching transistors of the rectifier, the output power of the wireless charging system significantly decreases. Therefore, how to lessen or even avoid impact on the output power of the wireless charging system while implementing the zero-voltage switching for the controllable switching transistors becomes a difficulty to be urgently resolved by a person skilled in the art.

SUMMARY

To resolve the foregoing technical issue in the existing technology, embodiments of the present invention provide a receive end and a transmit end of a wireless charging system, a method, an electrical terminal, and a system, so that system efficiency of a wireless charging system can be made as high as possible on a premise of ensuring that zero-voltage switching is implemented for controllable switching transistors of a rectifier.

According to a first aspect, an embodiment of this application provides a receive end of a wireless charging system, including a receive coil, a receive end compensation circuit, a rectifier, and a controller. The receive coil receives an alternating magnetic field and outputs an alternating current. The receive end compensation circuit is connected between the receive coil and the rectifier. The receive end compensation circuit is configured to: compensate the alternating current that is output by the receive coil, and output a compensated alternating current to the rectifier. The receive end compensation circuit and the receive coil form a receive end compensation network, and the receive end compensation network includes a first branch, a second branch, and a third branch. The first branch includes the receive coil. Both the first branch and the second branch are inductive branches and a reactance of the second branch is greater than that of the first branch, the first branch is connected to a first input end of the rectifier through the second branch, and the third branch is a capacitive branch. A first end of the third branch is connected to a common end of the first branch and the second branch, and a second end of the third branch is connected to a second input end of the rectifier. The rectifier includes controllable switching transistors, and the rectifier is configured to rectify the alternating current to a direct current. The controller is configured to: adjust a phase difference between a first bridge arm and a second bridge arm of the rectifier, and adjust a phase-shift angle between a bridge arm voltage of the rectifier and a fundamental component of an input current of the rectifier, so that zero-voltage switching is implemented for the controllable switching transistors of the rectifier.

According to this technical solution, an amplitude of a fundamental component of the bridge arm voltage is adjusted by adjusting the phase difference between the two bridge arms of the rectifier, so that a real part of an equivalent impedance of the rectifier can be adjusted. In addition, the equivalent impedance of the rectifier includes the real part and an imaginary part. The real part is a resistance, and the imaginary part is a reactance. According to this solution, the imaginary part of the equivalent impedance of the rectifier is adjusted by adjusting the phase-shift angle between the bridge arm voltage and the fundamental component of the input current of the rectifier. When the imaginary part of the equivalent impedance of the rectifier is quite small, the equivalent impedance of the rectifier may be considered as a purely resistive impedance, and a ZVS effect can be achieved for the controllable switching transistors of the rectifier. Moreover, an inductance compensation module is added to an input end of the rectifier, to weaken a capacitive part of the equivalent impedance of the rectifier and reduce reactive power of the wireless charging system, thereby improving system efficiency of the wireless charging system.

In a first possible implementation of the first aspect, the controller is specifically configured to: control the phase difference between the first bridge arm and the second bridge arm of the rectifier to be a target phase difference α, and control the phase-shift angle β between the bridge arm voltage of the rectifier and the fundamental component of the input current of the rectifier to be π−α+σ, where σ is a target value, α is used to adjust a resistance of an equivalent impedance of the rectifier, and σ is used to adjust a reactance of the equivalent impedance of the rectifier.

In this embodiment, the phase difference between the two bridge arms is adjusted to the target phase difference α, and the phase-shift angle β between the bridge arm voltage of the rectifier and the fundamental component of the input current of the rectifier is controlled to be π−α+σ, where σ is the target value. This improves transmission efficiency of the wireless charging system while implementing the ZVS for the controllable switching transistors of the rectifier.

With reference to any one of the first aspect or the possible implementation of the first aspect, in a second possible implementation, a is obtained from an external instruction, and a is preset inside the controller.

With reference to any one of the first aspect or the possible implementation of the first aspect, in a third possible implementation, a is obtained from an external instruction, and a is preset inside the controller.

The foregoing describes two implementations. In one implementation, a is obtained from the external instruction, and a is preset inside the controller. In the other implementation, a is obtained from the external instruction, and a is preset inside the controller. The external instruction may be obtained from a controller at a higher level than the controller, for example, obtained from an efficiency optimization controller of the wireless charging system.

Optionally, the receive end compensation network may include a receive end inductor-capacitor-inductor (LCL) compensation network and an inductance compensation module. Specifically, the second branch includes the inductance compensation module and an inductive sub-branch; the first branch, the third branch, and the inductive sub-branch form the LCL compensation network; and modulus values of the first branch, the third branch, and the inductive sub-branch are equal. The inductance compensation module is configured to weaken a capacitive part of the equivalent impedance of the rectifier.

Optionally, the first branch, the inductive sub-branch, and the third branch satisfy the following formula:

$jX_{L1} = -jX_C = jX_{L2}$, where $jX_{L1}$ is a reactance of the first branch, $-jX_C$ is a reactance of the third branch, and $jX_{L2}$ is a reactance of the inductive sub-branch.

Optionally, an inductance $L_{2\_comp}$ of the inductance compensation module is 0.3-3 times as great as a theoretical inductance L, and the theoretical inductance L is obtained according to the following formula:

$$L = \frac{\frac{8}{\pi^2} * \left(\sin\frac{\alpha}{2}\right)^2 * R_{dc} * \cos\left(\frac{\pi-\alpha}{2} + \sigma\right) * \sin\left(\frac{\pi-\alpha}{2} + \sigma\right)}{\omega_s},$$

where $\omega_s$ is an angular frequency of the fundamental component of the alternating current of the rectifier, and $R_{dc}$ is a load equivalent resistance when the wireless charging system performs output at full power.

Optionally, $$\alpha = \frac{2\pi}{3} \text{ and } \sigma = 0.$$

If the system uses a compensation inductance whose inductance value is equal to an inductance value that is calculated based on α=120° and σ=0, a change range of a modulus value of an imaginary part obtained after the rectifier and the inductance compensation module are connected in series can be relatively small when α or σ takes different values.

Optionally, $L_{2\_comp}$=L. To be specific, when an inductance value of the inductance compensation module is L, an effect is quite desirable, and costs of an inductor and an effect of weakening the capacitive part of the equivalent impedance of the rectifier by the inductor are considered.

Optionally, the second branch includes one inductor. When the second branch includes one inductor, a volume of a circuit can be reduced because a volume of an inductor is usually relatively large. In addition, if a plurality of inductors are integrated, interference exists between the inductors, and a magnetic leakage also exists. Therefore, when the second branch includes one inductor, both signal transmission and process costs are relatively desirable.

Optionally, the second branch includes two inductors: a first inductor and a second inductor. To prevent electromagnetic interference, the two inductors may be disposed symmetrically, and the two inductors are respectively connected to the two input ends of the rectifier. To be specific, the first branch is connected to a middle point of the first bridge arm of the rectifier through the first inductor, and the second end of the third branch is connected to a middle point of the second bridge arm of the rectifier through the second inductor.

Optionally, to better suppress electromagnetic interference, a reactance of the first inductor is equal to that of the second inductor.

Optionally, because the reactance of the second branch is greater than that of the first branch, a reactance part of the second branch that is greater than the reactance of the first branch can be used to weaken a capacitive part of the equivalent impedance of the rectifier.

Optionally, the controller is further configured to: receive a compensation phase sent by a transmit end, and adjust a from the target value to the compensation phase after receiving the compensation phase. The compensation phase is obtained by the transmit end based on a result of comparison between a reactive current that is output by an inverter of the transmit end and a preset reactive current.

According to a second aspect, an embodiment of this application further provides a receive end control method used in a receive end of a wireless charging system. The receive end includes a receive coil, a receive end compensation circuit, a rectifier, and a controller;

the receive coil is configured to receive an alternating magnetic field and output an alternating current. The receive end compensation circuit is connected between the receive coil and the rectifier. The receive end compensation circuit is configured to: compensate the alternating current that is output by the receive coil, and output a compensated alternating current to the rectifier. The receive end compensation circuit and the receive coil form a receive end compensation network, and the receive end compensation network includes a first branch, a second branch, and a third branch. The first branch includes the receive coil. Both the first branch and the second branch are inductive branches and a reactance of the second branch is greater than that of the first branch, the first branch is connected to a first input end of the rectifier through the second branch, and the third branch is a capacitive branch. A first end of the third branch is connected to a common end of the first branch and the second branch, and a second end of the third branch is connected to a second input end of the rectifier. The rectifier includes controllable switching transistors, and the rectifier is configured to rectify the alternating current to a direct current. The method includes:

adjusting a phase difference between a first bridge arm and a second bridge arm of the rectifier, and adjusting a phase-shift angle between a bridge arm voltage and a fundamental component of an input current of the rectifier, so that zero-voltage switching is implemented for the controllable switching transistors of the rectifier.

According to this method, an imaginary part of an equivalent impedance of the rectifier is adjusted by adjusting the phase-shift angle between the bridge arm voltage and the fundamental component of the input current of the rectifier. When the imaginary part of the equivalent impedance of the rectifier is quite small, the equivalent impedance of the rectifier may be considered as a purely resistive impedance, and a ZVS effect can be achieved for the controllable switching transistors of the rectifier. Moreover, an inductance compensation module is added to an input end of the rectifier, to weaken a capacitive part of the equivalent impedance of the rectifier and reduce reactive power of the wireless charging system, thereby improving system efficiency of the wireless charging system.

In a first implementation of the second aspect, the adjusting a phase difference between a first bridge arm and a second bridge arm of the rectifier, and adjusting a phase-shift angle between a bridge arm voltage and a fundamental component of an input current of the rectifier specifically includes:

controlling the phase difference between the first bridge arm and the second bridge arm of the rectifier to be a target phase difference $\alpha$, and controlling the phase-shift angle $\beta$ between the bridge arm voltage of the rectifier and the fundamental component of the input current of the rectifier to be $\pi-\alpha+\sigma$, where a is a preset value, $\alpha$ is used to adjust a resistance of an equivalent impedance of the rectifier, and $\sigma$ is used to adjust a reactance of the equivalent impedance of the rectifier.

With reference to any one of the second aspect or the possible implementation of the second aspect, in a first possible implementation, a is obtained from an external instruction, and $\sigma$ is preset inside the controller.

With reference to any one of the first aspect or the possible implementation of the first aspect, in a second possible implementation, a is obtained from an external instruction, and $\alpha$ is preset inside the controller.

With reference to any one of the first aspect or the possible implementations of the first aspect, in a third possible implementation, the method further includes:

receiving a compensation phase sent by a transmit end; and making a equal to the compensation phase, where the compensation phase is obtained by the transmit end based on a result of comparison between a reactive current that is output by an inverter of the transmit end and a preset reactive current.

According to a third aspect, an embodiment of this application further provides an electrical terminal, including a power consuming element, a battery, and the foregoing receive end;

the receive end is configured to charge the battery; and
the battery is configured to supply power to the power consuming element.

The electrical terminal may be any device using a wireless charging system, for example, may be an electric automobile. The receive end is located on the electric automobile, and a transmit end is on the ground.

According to a fourth aspect, an embodiment of this application further provides a transmit end of a wireless charging system, including an inverter, a transmit end compensation circuit, a transmit coil, and a controller of the transmit end;

the inverter is configured to convert, to an alternating current, a direct current that is output by a direct current power supply;

the transmit end compensation circuit is configured to: compensate the alternating current, and output a compensated alternating current to the transmit coil;

the transmit coil is configured to transmit the alternating current in a form of an alternating magnetic field;

the transmit coil and the transmit end compensation circuit form a transmit end LCL compensation network; and the controller of the transmit end is configured to send a compensation phase to a controller of a receive end, where the compensation phase is obtained by the controller of the transmit end based on a result of comparison between a reactive current that is output by the inverter of the transmit end and a preset reactive current, so that the controller of the receive end adjusts a reactance of an equivalent impedance of a rectifier based on the compensation phase.

When determining that a ZVS effect for controllable switching transistors of the inverter is lost, the controller of the transmit end may obtain the compensation phase and send the compensation phase to the controller of the receive end, so that the controller of the receive end adjusts power reflected by the receive end to the transmit end. When the reactive power of the transmit end is changed, the reactive current that is output by the inverter can be changed, so that the ZVS effect is implemented for the controllable switching transistors of the inverter, that is, a ZVS function is restored for the controllable switching transistors of the inverter.

According to a fifth aspect, an embodiment of this application provides a wireless charging system, including a transmit end and the foregoing receive end. The transmit end includes an inverter, a transmit end compensation circuit, and a transmit coil. The inverter is configured to convert, to an alternating current, a direct current that is output by a direct current power supply. The transmit end compensation circuit is configured to: compensate the alternating current, and output a compensated alternating current to the transmit coil. The transmit coil is configured to transmit the alternating current in a form of an alternating magnetic field. The transmit coil and the transmit coil form a transmit end LCL compensation network.

The receive end can achieve a ZVS effect for controllable switching transistors of a rectifier. Moreover, an inductance compensation module is added to an input end of the rectifier, to weaken a capacitive part of an equivalent impedance of the rectifier and reduce reactive power of the wireless charging system, thereby improving system efficiency of the wireless charging system.

Compared with the existing technology, the present invention has at least the following advantages.

The equivalent impedance of the rectifier decides a value of an output power of the rectifier, thereby deciding a value of an output power of the wireless charging system. The equivalent impedance of the rectifier is equal to a value obtained by dividing the bridge arm voltage of the rectifier by the input current of the rectifier. According to the technical solutions provided in the embodiments of this application, the amplitude of the fundamental component of the bridge arm voltage is adjusted by adjusting the phase difference between the two bridge arms of the rectifier, so that the real part of the equivalent impedance of the rectifier can be adjusted. In addition, the equivalent impedance of the rectifier includes the real part and the imaginary part. The real part is the resistance, and the imaginary part is the reactance. According to this solution, the imaginary part of the equivalent impedance of the rectifier is adjusted by adjusting the phase-shift angle between the bridge arm voltage and the fundamental component of the input current of the rectifier. When the imaginary part of the equivalent impedance of the rectifier is quite small, the equivalent impedance of the rectifier may be considered as a purely resistive impedance, and the ZVS effect can be achieved for the controllable switching transistors of the rectifier. Moreover, the inductance compensation module is added to the input end of the rectifier, to weaken the capacitive part of the equivalent impedance of the rectifier and reduce the reactive power of the wireless charging system, thereby improving system efficiency of the wireless charging system.

BRIEF DESCRIPTION OF DRAWINGS

To describe the technical solutions in the embodiments of this application or in the existing technology more clearly, the following briefly describes the accompanying drawings for describing the embodiments or the existing technology. Apparently, the accompanying drawings in the following description show some embodiments of this application, and a person of ordinary skill in the art may still derive other drawings from these accompanying drawings without creative efforts.

DESCRIPTION OF EMBODIMENTS

To make a person skilled in the art better understand technical solutions according to embodiments of this application, the following first describes a working principle of a wireless charging system.

Figure 1A:
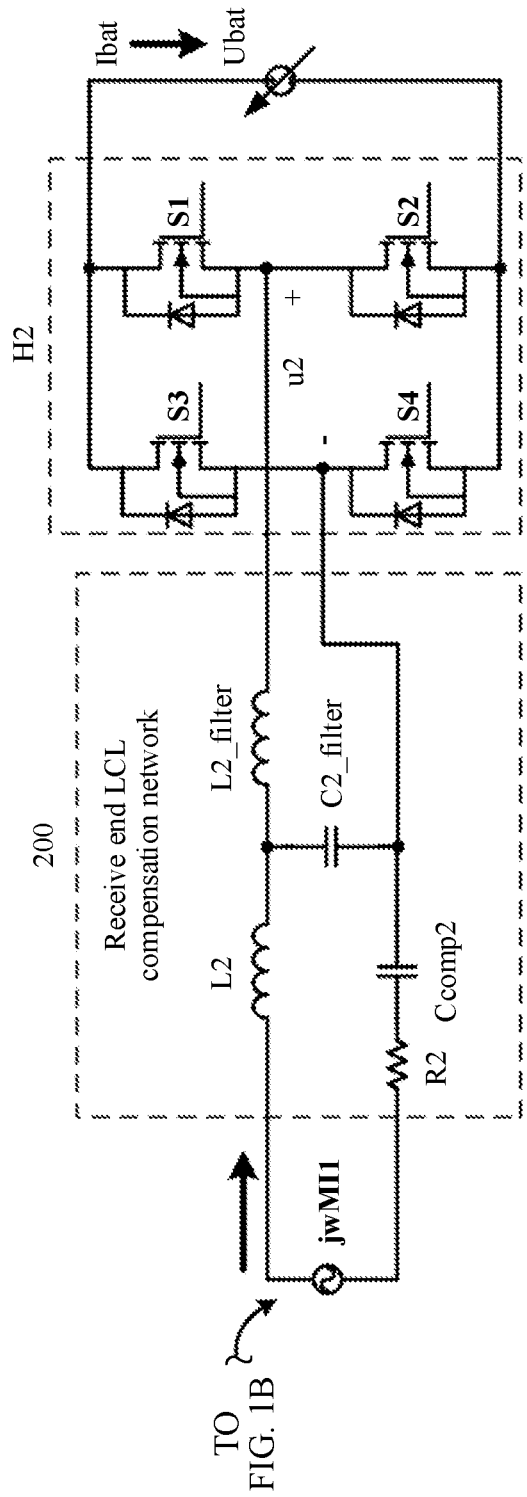
FIG. 1A and FIG. 1B are equivalent circuit diagrams of a wireless charging system.
Figure 1B:
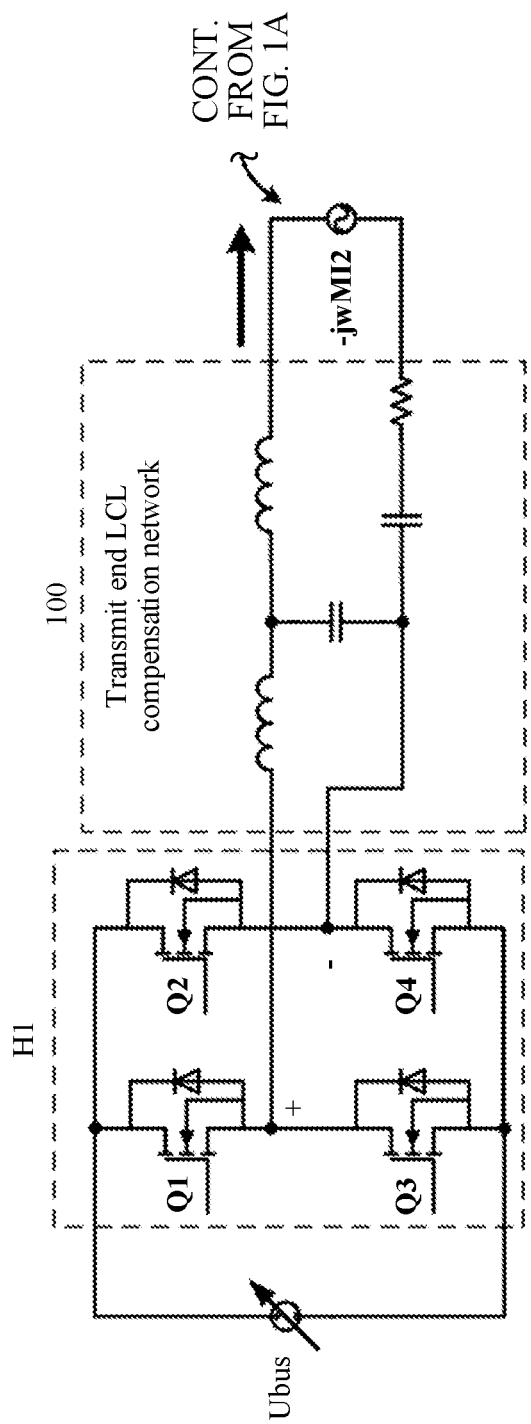

FIG. 1A and FIG. 1B are schematic diagrams of a wireless charging system.

The wireless charging system shown in FIG. 1A and FIG. 1B includes a transmit end and a receive end.

The wireless charging system may wirelessly charge an electrical terminal. In other words, the transmit end and the receive end are not connected in a wired manner, but transfer electromagnetic energy by exchanging an alternating magnetic field wirelessly.

During actual application, the transmit end of the wireless charging system usually includes an inverter, a transmit end compensation circuit, and a transmit coil. A function of the inverter is to convert, to an alternating current, a direct current that is output by a direct current power supply. A function of the transmit end compensation circuit is to compensate the alternating current, and output a compensated alternating current to the transmit coil. A function of the transmit coil is to transmit the alternating current in a form of an alternating magnetic field, so that a receive coil receives the alternating magnetic field wirelessly. In this embodiment of this application, the transmit end and the receive end each include an LCL compensation network. The LCL compensation network is not an actually included component, but is an architecture in which an actual electrical element is made to be equivalent to an LCL for theoretical analysis. For the transmit end, the transmit coil and the transmit end compensation circuit are equivalent to a transmit end LCL compensation network 100. For the receive end, the receive coil and a receive end compensation circuit are equivalent to a receive end LCL compensation network 200.

FIG. 1A and FIG. 1B are equivalent circuit diagrams for theoretical analysis. The transmit end includes an inverter H1 and the LCL compensation network 100, where L represents an inductor, and C represents a capacitor. Because a power supply Ubus connected to the transmit end is a direct current power supply, the inverter H1 needs to convert a direct current to an alternating current, and then the transmit coil of the transmit end can transmit an alternating magnetic field generated by the alternating current. H1 in FIG. 1B includes four controllable switching transistors: Q1 to Q4.

During actual application, the receive end includes the receive coil, the compensation circuit, and a rectifier H2. For theoretical analysis, the receive coil and the compensation circuit are equivalent to the receive end LCL compensation network, and therefore the receive coil and the compensation circuit are not shown in FIG. 1A and FIG. 1B. L2 in an inductive branch of the receive end LCL compensation network 200 in FIG. 1A includes the receive coil. During actual application, the receive end compensation circuit is connected between the receive coil and the rectifier H2; and the receive end compensation circuit compensates the alternating current that is output by the receive coil, and outputs a compensated alternating current to the rectifier H2.

In this way, it may be considered that the receive end includes the rectifier H2 and the LCL compensation network 200.

Because the system is a wireless charging system, what the transmit end and the receive end transfer is the alternating magnetic field. The two ends transfer the electromagnetic energy wirelessly, where the transmit coil is configured to transmit the alternating magnetic field, and the receive coil is configured to receive the alternating magnetic field transmitted by the transmit coil.

A function of the rectifier is to rectify the alternating current to a direct current. To make an equivalent impedance of the rectifier adjustable, the rectifier H2 needs to include controllable switching transistors. The equivalent impedance of the rectifier is adjusted by adjusting drive signals of the controllable switching transistors of the rectifier.

The rectifier H2 may be a full-bridge rectifier. The full-bridge rectifier may include four controllable switching transistors, or may include two controllable switching transistors. That the rectifier H2 in FIG. 1A includes four controllable switching transistors is used as an example for description. The four controllable switching transistors are S1 to S4.

In this embodiment of this application, zero-voltage switching control is implemented for the controllable switching transistors of the rectifier, to reduce losses generated by the controllable switching transistors in a working process.

The receive end provided in this embodiment of this application specifically adjusts the equivalent impedance of the rectifier, so that system efficiency of the wireless charging system can be made as high as possible on a premise of ensuring that zero-voltage switching is implemented for the controllable switching transistors of the rectifier. The equivalent impedance of the rectifier is equal to a value obtained by dividing a bridge arm voltage of the rectifier by an input current of the rectifier. To achieve relatively high system efficiency, a real part and an imaginary part of the equivalent impedance of the rectifier can be adjusted, where the real part is a resistance, and the imaginary part is a reactance. The imaginary part of the equivalent impedance is made as small as possible, and the real part of the equivalent impedance is made as large as possible. However, in a process of making the real part of the equivalent impedance of the rectifier as large as possible, the imaginary part increases inevitably. Therefore, in this embodiment of this application, an inductance compensation module is added to weaken the imaginary part that simultaneously increases, and an inductor in the inductance compensation module is used to weaken reactive power resulting from a capacitive impedance. This further improves efficiency of the wireless charging system.

To make a person skilled in the art better understand and implement the technical solutions provided in the embodiments of this application, the following details implementations of the technical solutions with reference to the accompanying drawings.

Figure 2:
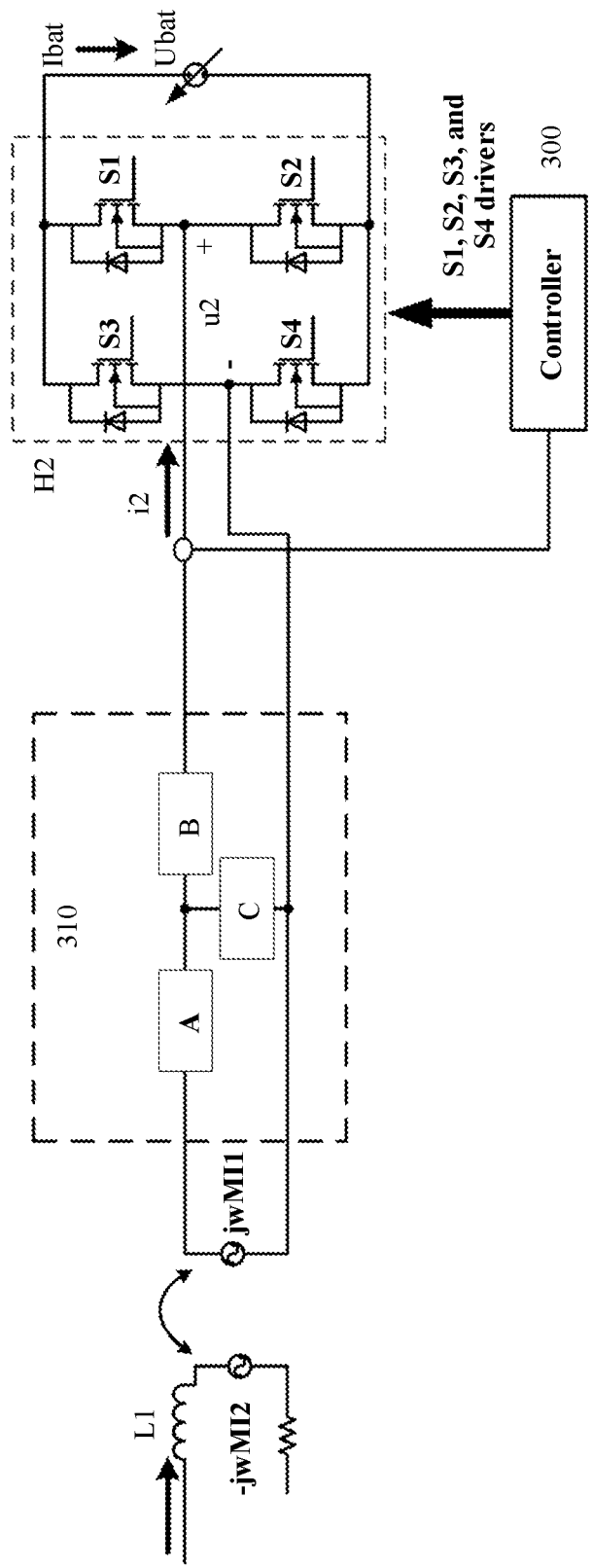
FIG. 2 is a schematic diagram of a receive end of a wireless charging system according to an embodiment of this application.

Receive end embodiment 1:

FIG. 2 is a schematic diagram of a receive end of a wireless charging system according to an embodiment of this application.

A transmit end and the receive end of the wireless charging system each usually include a compensation network, and the compensation network is an equivalent network formed by a compensation circuit and a coil. To implement structural symmetry, the transmit end and the receive end may usually use compensation networks of a same type. FIG. 2 does not show a transmit end compensation network, and only shows a receive end compensation network.

As described in FIG. 1A, the receive end includes the receive coil, the receive end compensation circuit, and the rectifier H2. Details are not described herein again. The following mainly describes improvements of this embodiment of this application. The receive end of the wireless charging system provided in this embodiment further includes a controller 300.

In this embodiment, the receive end compensation circuit and the receive coil form a receive end compensation network 3000, and the receive end compensation network 310 includes a first branch A, a second branch B, and a third branch C. The first branch A includes the receive coil. Both the first branch A and the second branch B are inductive branches and a reactance of the second branch B is greater than that of the first branch A, the first branch A is connected to a first input end of the rectifier H2 through the second branch B, and the third branch C is a capacitive branch. A first end of the third branch C is connected to a common end of the first branch A and the second branch B, and a second end of the third branch C is connected to a second input end of the rectifier H2. The rectifier H2 includes two input ends, that is, a middle point of a first bridge arm and a middle point of a second bridge arm. The first bridge arm may be a bridge arm including S1 and S2, and the second bridge arm may be a bridge arm including S3 and S4. In the figure, B is connected to the middle point of the first bridge arm, and C is connected to the middle point of the second bridge arm. A, B, and C each may include one or more components. This is not specifically limited in this embodiment of this application. In addition, B may include two parts. To be specific, one part is connected to the middle point of the first bridge arm, and the other part is connected to the middle point of the second bridge arm, provided that the two parts are in a circuit in which B is located.

Moreover, the first bridge arm and the second bridge arm are merely relative concepts, and are interchangeable.

The receive end compensation network 310 may be implemented in a plurality of manners. This is not specifically limited in this embodiment of this application. The following only describes three implementations. A first implementation is: The receive end compensation network 310 includes a receive end LCL compensation network and an inductance compensation module. A second implementation is: An inductance compensation module and an inductive sub-branch are integrated; in other words, the second branch includes one inductor. A third implementation is: The second branch includes a first inductor and a second inductor, the first branch is connected to the middle point of the first bridge arm of the rectifier through the first inductor, and the second end of the third branch is connected to the middle point of the second bridge arm of the rectifier through the second inductor.

To implement ZVS for a switching transistor of the rectifier H2, it is expected that during work of the switching transistor, a voltage at two ends of the switching transistor is as low as possible, because a lower voltage leads to lower power consumption. Specifically, a phase of a bridge arm voltage of the rectifier H2 may be controlled to lag behind a phase of an input current of the rectifier H2. However, this causes an equivalent impedance of the rectifier H2 to be capacitive, and consequently a phase difference between a current of a transmit coil and a current of the receive coil of the wireless charging system is not equal to 90 degrees, thereby reducing transmission efficiency of the system. This is because transmission efficiency of the system is relatively high when the phase difference between the current of the transmit coil and the current of the receive coil is 90 degrees.

In view of this, to ensure that the phase difference between the current of the transmit coil and the current of the receive coil is 90 degrees and that a ZVS effect is implemented for the rectifier H2, in this embodiment of this application, the reactance of the second branch is greater than that of the first branch A. Therefore, the reactance of the second branch can weaken a capacitive part of the equivalent impedance of the rectifier H2, to make the equivalent impedance of the rectifier H2 close to resistive.

The rectifier H2 includes controllable switching transistors, and the rectifier H2 is configured to rectify an alternating current from the receive coil to a direct current. H2 may be a full-bridge rectifier. All of four switching transistors of the full-bridge rectifier may be controllable switching transistors; or two of the four switching transistors are controllable switching transistors, and the other two switching transistors are diodes. That the four switching transistors are all controllable switching transistors is merely used as an example for description in this embodiment. As shown in FIG. 2, the four controllable switching transistors are S1, S2, S3, and S4.

A function of the controller 300 in this embodiment is to adjust a phase difference between the first bridge arm and the second bridge arm of the rectifier H2, and adjust a phase-shift angle between a fundamental component of an input current and the bridge arm voltage of the rectifier H2. In this way, zero-voltage switching is implemented for the controllable switching transistors of the rectifier H2, and power consumption of the controllable switching transistors is reduced.

It can be understood that the phase difference between the first bridge arm and the second bridge arm of the rectifier H2 is a phase difference between drive signals of the controllable switching transistors on the two bridge arms.

When the rectifier H2 is a full-bridge rectifier, the bridge arm voltage is a voltage between the middle point of the first bridge arm and the middle point of the second bridge arm. The equivalent impedance of the rectifier H2 is equal to a value obtained by dividing the bridge arm voltage by the input current. Therefore, an amplitude of a fundamental component of the bridge arm voltage can be adjusted by adjusting the phase difference between the first bridge arm and the second bridge arm of the rectifier H2.

During specific implementation, the controller 300 may specifically adjust the phase difference and the phase-shift angle by changing drive signals output to S1 to S4.

Figure 3:
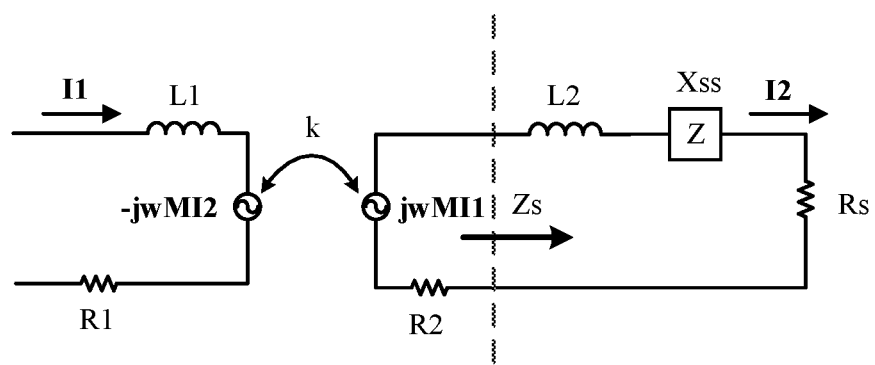
FIG. 3 is a schematic equivalent diagram of a receive coil and a transmit coil of a wireless charging system according to an embodiment of this application.

For ease of understanding an application scenario in this embodiment of this application, losses of a transmit coil and the receive coil of the wireless charging system account for a relatively high proportion of a total loss of the system. With reference to FIG. 3, the following may analyze implementation conditions for achieving relatively high system efficiency.

FIG. 3 is a schematic equivalent diagram of a receive coil and a transmit coil of a wireless charging system according to an embodiment of this application.

$I_1$ is a current of the transmit coil, M is a mutual inductance between the transmit coil and the receive coil, $\omega$ is an angular frequency of $I_1$, $R_1$ is a resistance of the transmit coil, $R_2$ is a resistance of the receive coil, $L_1$ is a self-inductance of the transmit coil, $L_2$ is a self-inductance of the receive coil, k is a coefficient of coupling between the transmit coil and the receive coil, $X_{ss}$ is a load equivalent reactance, $R_s$ is a load equivalent resistance, and $I_2$ is a current of the receive coil.

Therefore, the current $I_1$ of the transmit coil is expressed in the following formulas. $Z_S$ is a load equivalent impedance of an induced voltage $j\omega MI_1$ of the receive coil, and $X_s$ and $R_s$ are a real part and an imaginary part that are corresponding to the load equivalent impedance. The formulas are as follows:

$$X_s = \omega L_2 + X_{ss} \quad (1)$$

$$Z_s = jX_s + R_s \quad (2)$$

Coil efficiency $\eta$ of the system is expressed in the following formula:

$$\eta = \frac{I_2^2 * R_s}{I_1^2 * R_1 + I_2^2 * R_2 + I_2^2 * R_S}, \text{ where} \quad (3)$$

$$I_2 = \frac{j\omega M I_1}{R_2 + Z_s} \quad (4)$$

It can be learnt from the formula (2) and the formula (3) that, when the imaginary part $X_s$ of $Z_s$ is 0 and $R_s$ is equal to a maximum value $R_{s\_max}$, system efficiency is highest, where $$R_{s\_max} = R_2 * \sqrt{1 + \left(k * \sqrt{\frac{\omega * L_1}{R_1} * \frac{\omega * L_2}{R_2}}\right)^2} \quad (5)$$

$$I_1 = \frac{R_2 + R_{s\_max}}{\omega * k \sqrt{L_1 * L_2}} * \sqrt{\frac{P}{R_{s\_max}}} \quad (6)$$

It can be learnt from the formula (5) that $R_{s\_max}$ is unrelated to the current $I_1$ of the transmit coil. Therefore, an output power can be adjusted by adjusting the current $I_1$ of the transmit coil, so that the wireless charging system reaches a target power P.

In this case, two conditions for achieving relatively high system efficiency are as follows:

(1) the imaginary part $X_s$ is 0; and
(2) the load equivalent impedance $Z_s$ is adjusted to make the real part $R_s$ of $Z_s$ reach $R_{s\_max}$, so that the system efficiency is highest.

The following describes a relationship between $Z_s$ and the equivalent impedance of the rectifier when the compensation network is an LCL compensation network.

Figure 4:
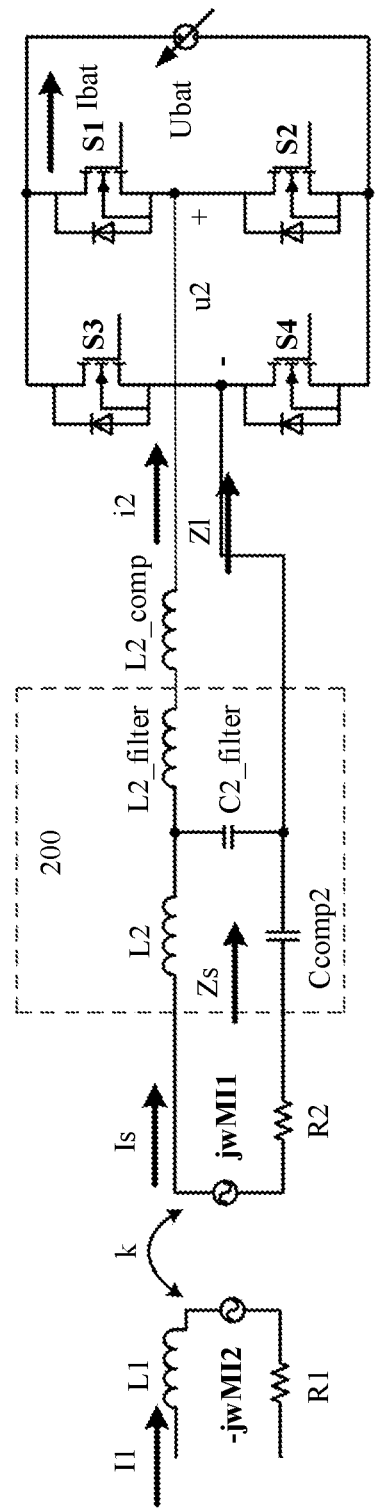
FIG. 4 is a schematic diagram of a wireless charging system including an LCL compensation network according to an embodiment of this application.

FIG. 4 is a schematic diagram of a wireless charging system including an LCL compensation network according to an embodiment of this application.

The receive end uses an LCL compensation network, where the LCL compensation network satisfies the following conditions:

A modulus value of an impedance resulting from connecting $L_2$ and $C_{comp2}$ in series, a modulus value of an impedance of $C_{2\_filter}$, and a modulus value of an impedance of $L_2$ filter are equal to each other, and a resonance frequency of $L_2$ filter and $C_{2\_filter}$ is equal to a working frequency of the wireless charging system.

The equivalent impedance of the rectifier is $$Z_1 = \frac{\dot{U}_2}{\dot{I}_2},$$

where $U_2$ and $I_2$ in the equation are the fundamental component of the bridge arm voltage and the fundamental component of the input current of the rectifier, respectively.

It can be learnt from FIG. 4 that the relationship between $Z_s$ and $Z_l$ is expressed in the following formula:

$$Z_s = \frac{(\omega L_{2\_filter})^2}{Z_1} \quad (7)$$

It can be learnt from the formula (2) that, if $Z_s = R_{s\_max}$, when $Z_l$ is purely resistive (where a power factor is $PF_{Z_l}=1$) and a resistance is $$R_{lmax} = \frac{(\omega L_{2\_filter})^2}{R_{s\_max}},$$

system efficiency is highest.

In this case, when the receive end uses the LCL compensation network, conditions for achieving optimal system efficiency are transformed into two conditions related to $Z_l$:

(1) an imaginary part $X_l$ of $Z_l$ is 0; and (2) $Z_l$ is adjusted to make a real part $R_l$ of $Z_l$ reach $R_{l\_max}$, so that the system efficiency is highest.

Therefore, only an impedance characteristic of $Z_l$ is analyzed to analyze optimal system efficiency in the following.

Because $$Z_1 = \frac{\dot{U}_2}{\dot{I}_2},$$

a value of $$Z_1 = \frac{\dot{U}_2}{\dot{I}_2}$$

can be adjusted by adjusting the amplitude of the fundamental component $\dot{U}_2$ of the bridge arm voltage of the rectifier and adjusting the phase-shift angle between the bridge arm voltage and the fundamental component $I_2$ of the input current. The amplitude of the fundamental component of the bridge arm voltage of the rectifier may be adjusted by adjusting the phase difference between the first bridge arm and the second bridge arm of the rectifier.

Figure 5:
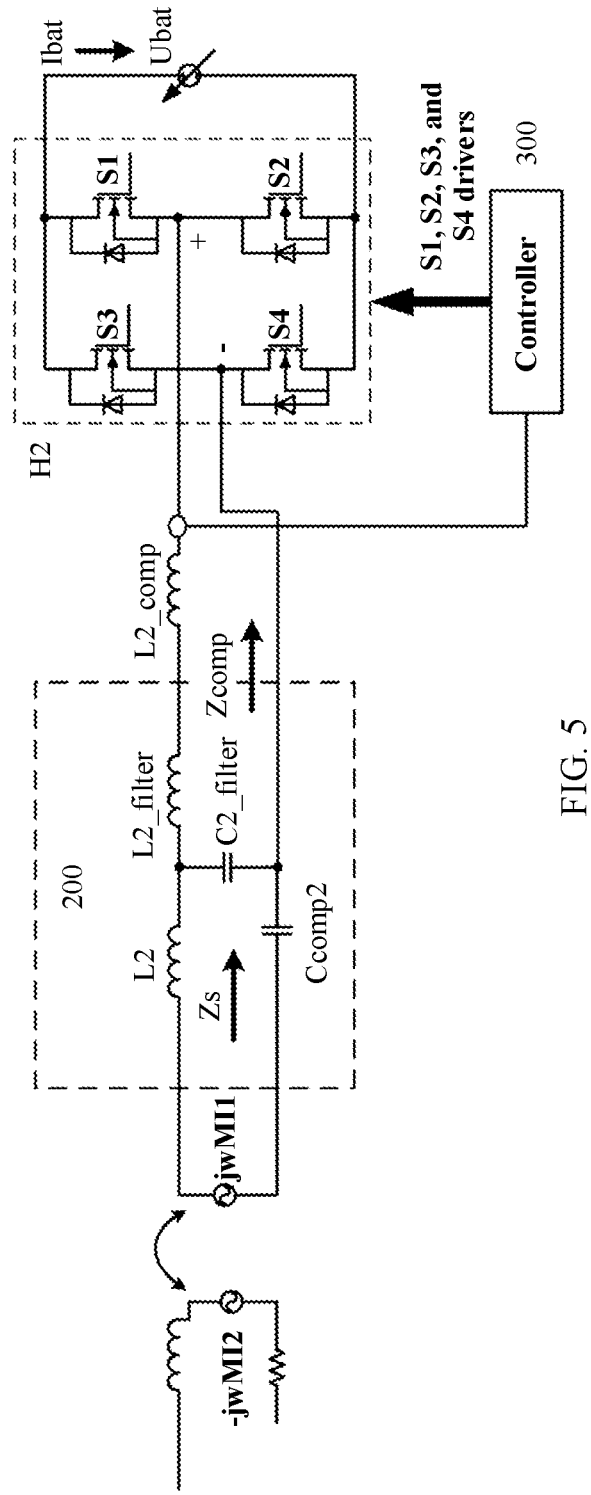
FIG. 5 is an equivalent circuit diagram of a receive end according to an embodiment of this application.

With reference to FIG. 5, the following describes a specific implementation when the receive end compensation network 310 includes the receive end LCL compensation network 200 and the inductance compensation module.

The receive end LCL compensation network 200 includes the first branch (including $L_2$ and a capacitor $C_{comp2}$ connected in series to L2), the inductive sub-branch L2_filter, and the third branch C2_filter of the receive end compensation network 310, where the first branch may include $C_{comp2}$, or may not include $C_{comp2}$. When the first branch includes $C_{comp2}$, $C_{comp2}$ is a capacitor in the compensation circuit. Structures of different compensation circuits differ from each other. This is not specifically limited in this embodiment of this application.

A resistor R2 in FIG. 5 is not an actual resistor but an equivalent resistor of the receive coil.

The first branch is connected to the middle point of the first bridge arm of the rectifier H2 through the inductive sub-branch L2_filter and the inductance compensation module L2_comp successively. In FIG. 5, the first bridge arm is a bridge arm including S1 and S2, and the second bridge arm is a bridge arm including S3 and S4.

The first end of the third branch C2_filter is connected to the common end of the first branch and the inductive sub-branch, and the second end of the third branch C2_filter is connected to the middle point of the second bridge arm of the rectifier, where modulus values of the first branch, the inductive sub-branch $L_2$ filter, and the third branch C2_filter are equal to each other.

The inductive sub-branch and the inductance compensation module form the second branch.

It can be understood that during actual application, an inductor in the LCL compensation network may be one or more inductors, or may be a combination of an inductor and a capacitor. This is not specifically limited in this embodiment of this application.

Likewise, the inductance compensation module L2_comp may include one or more inductors. This is not specifically limited in this embodiment of this application.

The first branch, the inductive sub-branch, and the third branch satisfy the following formula:

$$jX_{L1} = -jX_C = jX_{L2} \quad (8), \text{where}$$

$jX_{L1}$ is the reactance of the first branch, the first branch includes the receive coil, $-jX_C$ is a reactance of the third branch, and $jX_{L2}$ is a reactance of the inductive sub-branch.

It should be noted that, for the LCL compensation network formed by the inductor and the capacitor, the formula (8) holds true. However, the inductance compensation module added in this embodiment of this application is not a component in the LCL compensation network, and therefore the formula (8) does not hold true in this case.

Figure 6A:
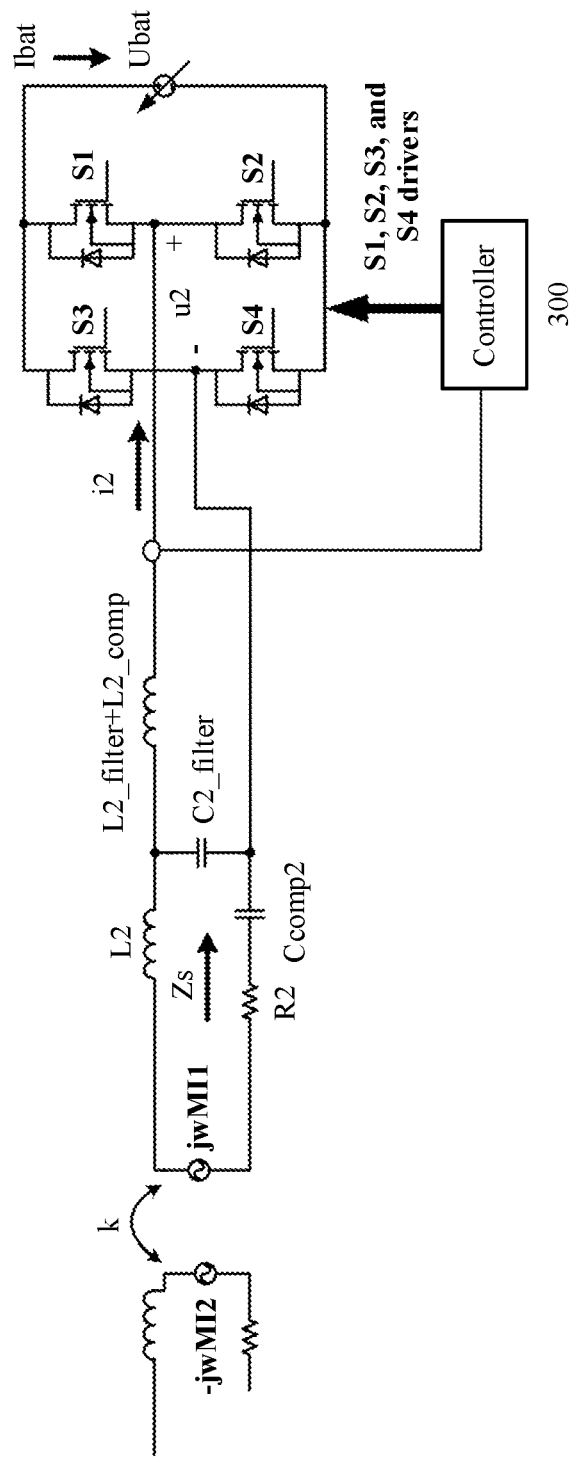
FIG. 6A is a schematic diagram illustrating that an inductance compensation module and an LCL compensation network are integrated according to an embodiment of this application.

In specific application, the inductance compensation module may be an inductor independent of the LCL compensation network, or may be integrated with the LCL compensation network. For example, the inductance compensation module and the inductive sub-branch may be combined into one. For details, refer to FIG. 6A. FIG. 6A is a schematic diagram illustrating that an inductance compensation module and an LCL compensation network are integrated. To be specific, L2_comp and the inductive sub-branch L2_filter are integrated, and an integrated inductor is L2_comp+ L2_filter. This means that the second branch B of the receive end compensation network 310 includes only one inductor.

However, when the inductor of the inductance compensation module and an inductor of the inductive sub-branch are integrated into one inductor, for the integrated inductor, the formula (8) does not hold true. Obviously, an inductance value of the integrated inductor is greater than $L_{2\_filter}$ in the formula (8).

Figure 6B:
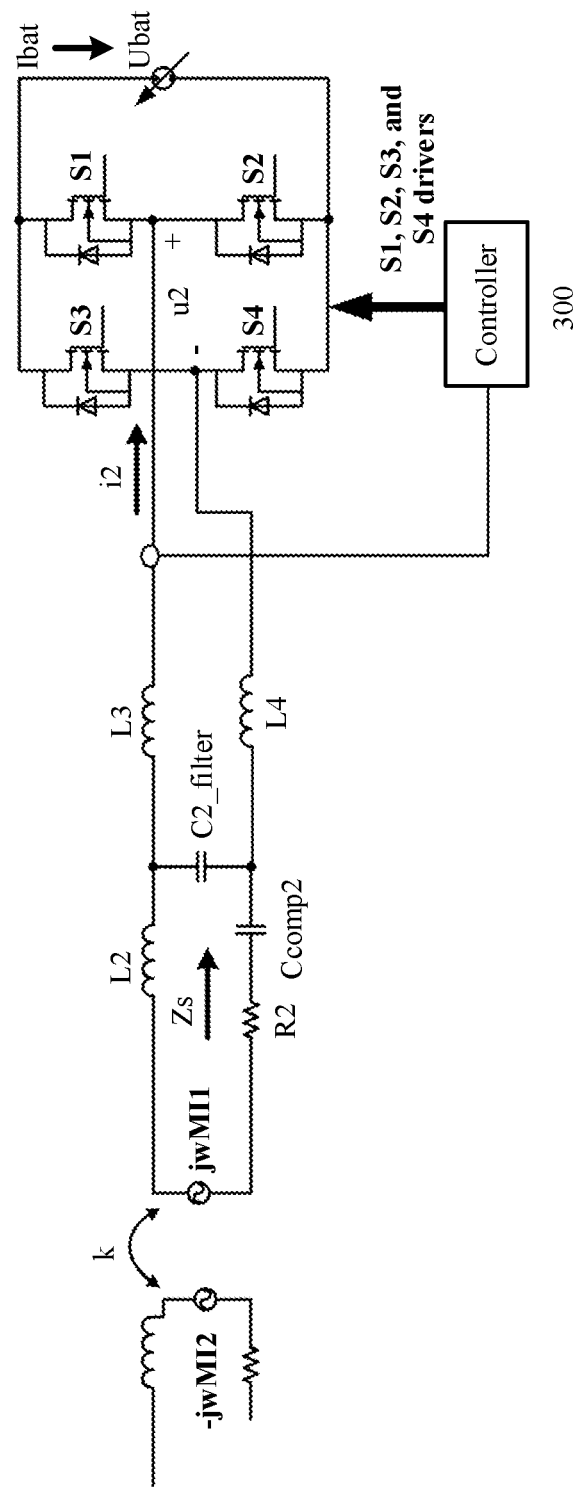
FIG. 6B is a schematic diagram of another receive end according to an embodiment of this application.

In addition, the inductor in the second branch of the receive end compensation network may further include the first inductor and the second inductor, as shown in FIG. 6B. The first branch is connected to the middle point of the first bridge arm of the rectifier H2 through the first inductor L3, and the second end of the third branch is connected to the middle point of the second bridge arm of the rectifier H2 through the second inductor L2. Two inductors are disposed in the third branch, and are respectively connected to the two input ends of the rectifier, to reduce electromagnetic interference and improve quality of the input current. To achieve a relatively desirable effect, a reactance of the first inductor and a reactance of the second inductor may be set to be the same.

The controller adjusts the phase difference between the first bridge arm and the second bridge arm of the rectifier, and adjusts the phase-shift angle between the fundamental component of the bridge arm voltage and the fundamental component of the input current of the rectifier, so that the zero-voltage switching is implemented for the controllable switching transistors of the rectifier. Specifically, the phase difference may be set as a to-be-adjusted object, and the phase-shift angle may be set to a preset value. Alternatively, the phase difference may be set to a preset value, and the phase-shift angle may be set as a to-be-adjusted object.

The following first describes an implementation of setting the phase difference as a to-be-adjusted object and setting the phase-shift angle to a preset value.

Figure 7:
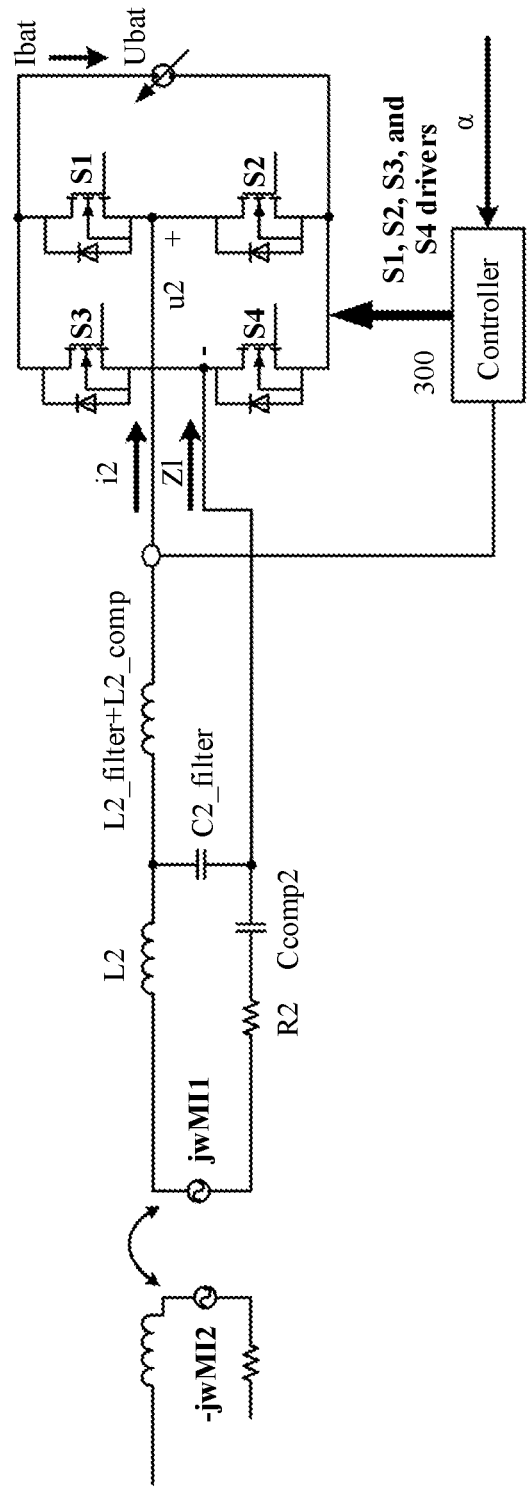
FIG. 7 is a schematic diagram of still another receive end according to an embodiment of this application.

Receive end embodiment 2:

FIG. 7 is a schematic diagram of still another receive end according to an embodiment of this application.

For the receive end provided in this embodiment, content that is the same as content in the embodiment 1 is not described herein again.

In this embodiment, the controller 300 is specifically configured to control the phase difference between the first bridge arm and the second bridge arm of the rectifier H2 to be a target phase difference α, where a is used to adjust a resistance of the equivalent impedance of the rectifier. The controller 300 in this embodiment receives the target phase difference α. In addition, the controller 300 is specifically configured to control the phase-shift angle β between the bridge arm voltage and the fundamental component of the input current of the rectifier H2 to be π−α+σ, where σ is a first preset value, and specifically σ is a first preset value that is set inside the controller 300. The controller 300 may preset σ to a relatively small positive value, for example, set σ to a value within 0 to π/12. σ is used to adjust a reactance of the equivalent impedance of the rectifier.

The controller 300 may receive the target phase difference from a system efficiency controller (not shown in the figure). The system efficiency controller is configured to: obtain current system efficiency based on an output power and an input power of the wireless charging system; and if the current system efficiency increases relative to previous system efficiency, increase a previous target phase difference by a first preset phase step to obtain a current target phase difference, and send the current target phase difference to the controller 300; or if the current system efficiency is lower than previous system efficiency, decrease a previous target phase difference by a first preset phase step to obtain a current target phase difference, and send the current target phase difference to the controller 300.

It can be understood that control of the wireless charging system on the rectifier H2 is cyclic control, system efficiency needs to be obtained based on the output power and the input power, and a needs to be continually adjusted until optimal system efficiency is achieved. In contrast, in this technical solution provided in this embodiment of this application, only in the cyclic control process, ZVS is implemented for controllable switching transistors of the rectifier H2 while ensuring system efficiency. Specific manners of achieving system efficiency and adjusting the system efficiency are not specifically limited in this embodiment of this application.

Figure 8:
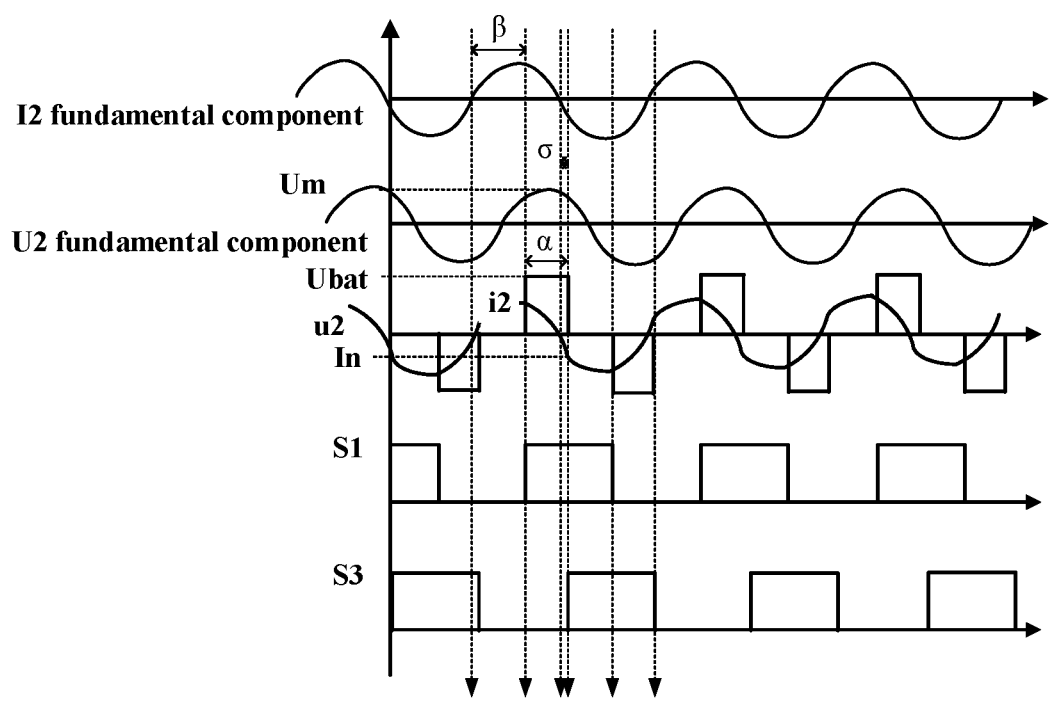
FIG. 8 is a waveform graph corresponding to FIG. 7 according to an embodiment of this application.

The following details a working principle in FIG. 7 with reference to a waveform graph shown in FIG. 8.

u2 in FIG. 8 represents the bridge arm voltage of the rectifier, where the bridge arm voltage is represented by a square wave; i2 represents the input current of the rectifier; U2 represents the fundamental component of u2; and I2 represents the fundamental component of i2. Ubat represents an amplitude of the bridge arm voltage of the rectifier, and Um represents an amplitude of U2.

"In" represents a negative current. If the ZVS is to be implemented for the controllable switching transistors of the rectifier, "In" needs to be controlled to be greater than 0. Therefore, in this embodiment of this application, a is adjusted to make "In" less than 0. To be specific, i2 is negative at a falling edge in a positive half-cycle of u2, and i2 is positive at a rising edge in a negative half-cycle of u2.

The directly detected bridge arm voltage and input current each include a high-order harmonic wave, and therefore the fundamental component of the bridge arm voltage and the fundamental component of the input current are used in the control process in this embodiment.

S1 and S3 in FIG. 8 are waveforms of drive signals corresponding to the controllable switching transistors S1 and S3 of the rectifier.

It can be learnt from FIG. 8 that, a phase of U2 lags behind a phase of I2; and a phase of u2 also lags behind the phase of I2, and an angle at which the phase of u2 lags behind the phase of I2 is β, that is, the phase-shift angle is β.

In addition, because the rising edge corresponding to the positive half-cycle of u2 is the same as a rising edge of a drive signal corresponding to S1, an angle at which the rising edge of the drive signal of S1 lags behind the phase of I2 is also β.

It can be learnt from FIG. 8 that a phase difference between the drive signals corresponding to S1 and S3 is α. Because S1 is corresponding to the first bridge arm and S3 is corresponding to the second bridge arm, it can be learnt that a phase of the first bridge arm is ahead of a phase of the second bridge arm by α.

Moreover, it can be learnt from FIG. 8 that β=π−α+σ.

In the H bridge, drive signals of S1 and S2 are complementary, and drive signals of S3 and S4 are complementary. Control on S2 and S4 is not described herein.

The receive end provided in this embodiment of this application controls the phase difference between the bridge arm voltage and the input current of the rectifier in the receive end, and controls the phase-shift angle between the first bridge arm and the second bridge arm, to implement the ZVS for the controllable switching transistors of the rectifier. σ is in direct proportion to a zero-voltage switching ZVS effect of the controllable switching transistors of the rectifier. In other words, the ZVS effect is implemented more easily as a increases.

For the fundamental component of the input current of the rectifier, a current sensor may collect the input current of the rectifier; and then a filter may filter the collected input current to filter out the high-order harmonic wave, and obtain the fundamental component of the input current. The fundamental component of the collected input current belongs to an analog signal. To convert the analog signal into a digital signal that can be received by the controller, a zero-crossing detector may be used to perform zero-crossing detection on the fundamental component of the input current, obtain a fundamental component that is of the input current and that is in a digital form, and send the obtained fundamental component to the controller. The fundamental component of the input current of the rectifier may alternatively be obtained in another manner. This is not specifically limited in this embodiment of this application.

Figure 9:
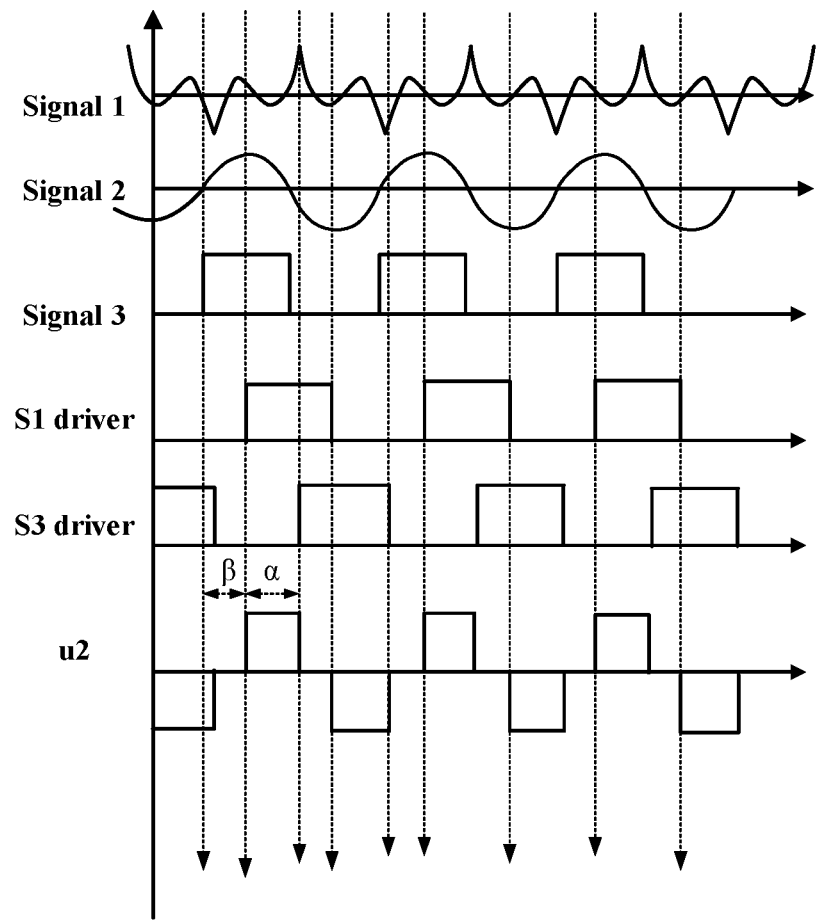
FIG. 9 is a waveform graph of an input current of a rectifier according to an embodiment of this application.

For details, refer to FIG. 9. FIG. 9 is a waveform graph of an input current of a rectifier.

In FIG. 9, signal 1 represents the input current of the rectifier; signal 2 represents the fundamental component that is of the input current and that is obtained after signal 1 is filtered; and signal 3 represents a digital-form fundamental component, namely, a square wave, that is of the input current and that is obtained after zero-crossing detection is performed on signal 2.

It can be learnt from FIG. 9 that a phase difference between S1 and S3 is α. A phase difference between the bridge arm voltage u2 and the fundamental component signal 3 that is of the input current and that is obtained after zero-crossing detection is performed is β.

To make a person skilled in the art better understand technical effects in this embodiment, the following still describes the principle with reference to FIG. 7.

As described above, the value of the real part of $$Z_1 = \frac{\dot{U}_2}{\dot{I}_2}$$

may be adjusted by adjusting α. An expression of $Z_I$ is as follows:

$$Z_1 = \left(\frac{2\sqrt{2}}{\pi}\sin\frac{\alpha}{2}\right)^2 R_{dc}\cos\left(\frac{\pi-\alpha}{2}+\sigma\right)*\left(\cos\left(\frac{\pi-\alpha}{2}+\sigma\right)-j\sin\left(\frac{\pi-\alpha}{2}+\sigma\right)\right) \quad (9)$$

In this embodiment of this application, an inductance compensation module is added based on LCL compensation, an inductance $L_{2\_comp}$ of the inductance compensation module may be 0.3-3 times as great as a theoretical inductance L, and the theoretical inductance L is obtained according to the following formula:

$$L = \frac{\frac{8}{\pi^2} * \left(\sin\frac{\alpha}{2}\right)^2 * R_{dc} * \cos\left(\frac{\pi-\alpha}{2}+\sigma\right) * \sin\left(\frac{\pi-\alpha}{2}+\sigma\right)}{\omega_s}, \quad (10)$$

where $\omega_s$ is an angular frequency of the fundamental component of the input current of the rectifier, and $R_{dc}$ is a load equivalent resistance when the wireless charging system performs output at full power.

In an implementation, it may be specified that $$\alpha = \frac{2\pi}{3} \text{ and } \sigma = 0.$$

In addition, $L_{2\_comp}$ of the inductance compensation module may directly take a value of the theoretical inductance.

Figure 10:
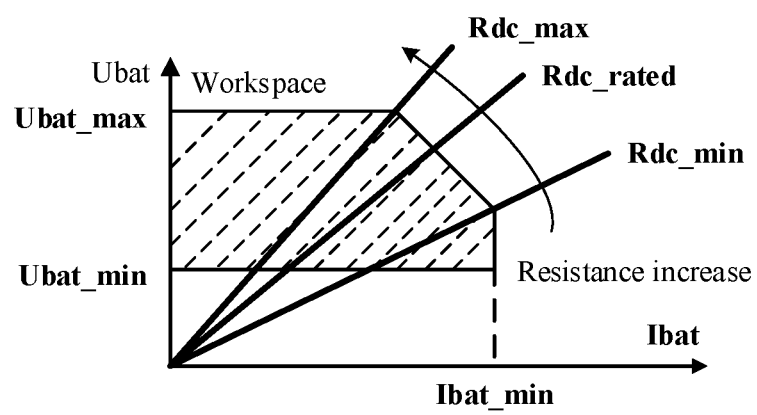
FIG. 10 is a schematic diagram of a corresponding output working range (a dashed-line region) when a wireless charging system charges a battery according to an embodiment of this application.

FIG. 10 is a schematic diagram of a corresponding output working range (a dashed-line region) when a wireless charging system charges a battery.

In this embodiment, the wireless charging system charges the battery. For example, the battery is a power battery. This is used in a case in which an electrical terminal is an electric automobile.

It can be learnt from FIG. 10 that during output at full power, a range of the load $R_{dc}$ is from $R_{dc\_min}$ to $R_{dc\_max}$. Actually, a value within $R_{dc\_min}$ to $R_{dc\_max}$ may be selected based on a region in which optimization needs to be performed.

In this embodiment, on a premise of ensuring that the ZVS is implemented for the controllable switching transistors of the rectifier, a resistive part $R_I$ of the equivalent impedance (including a capacitive imaginary part) of the rectifier is adjusted to make $R_I$ close to $R_{I\_max}$, and the inductance compensation module is added to weaken a capacitive part X1 (which is a negative value) of the equivalent impedance of the rectifier.

In a whole process of adjusting the real part $R_I$ of the rectifier, an entire PF value, namely, $PF_{comp}$, of an impedance $Z_{comp}$ resulting from connecting the compensation inductor and the rectifier in series is made to close to 1, where $$Z_{comp} = R_1 + j(\omega_s L_{2\_comp} + X_1) \quad (11)$$

$$PF_{comp} = \frac{R_1}{\sqrt{R_1^2 + (\omega_s L_{2\_comp} + X_1)^2}}$$

When β=π−α+σ, σ is a relatively small positive-value constant. The fundamental component of u2 lags behind the fundamental component of i2 and a difference between them is $$\frac{\pi-\alpha}{2}+\sigma,$$

and the amplitude of the fundamental component of u2 is $$U_m = \frac{2\sqrt{2}}{\pi}\sin\frac{\alpha}{2}U_{bat}.$$

It can be learnt that $Z_l$ is resistive and capacitive.

Figure 11:
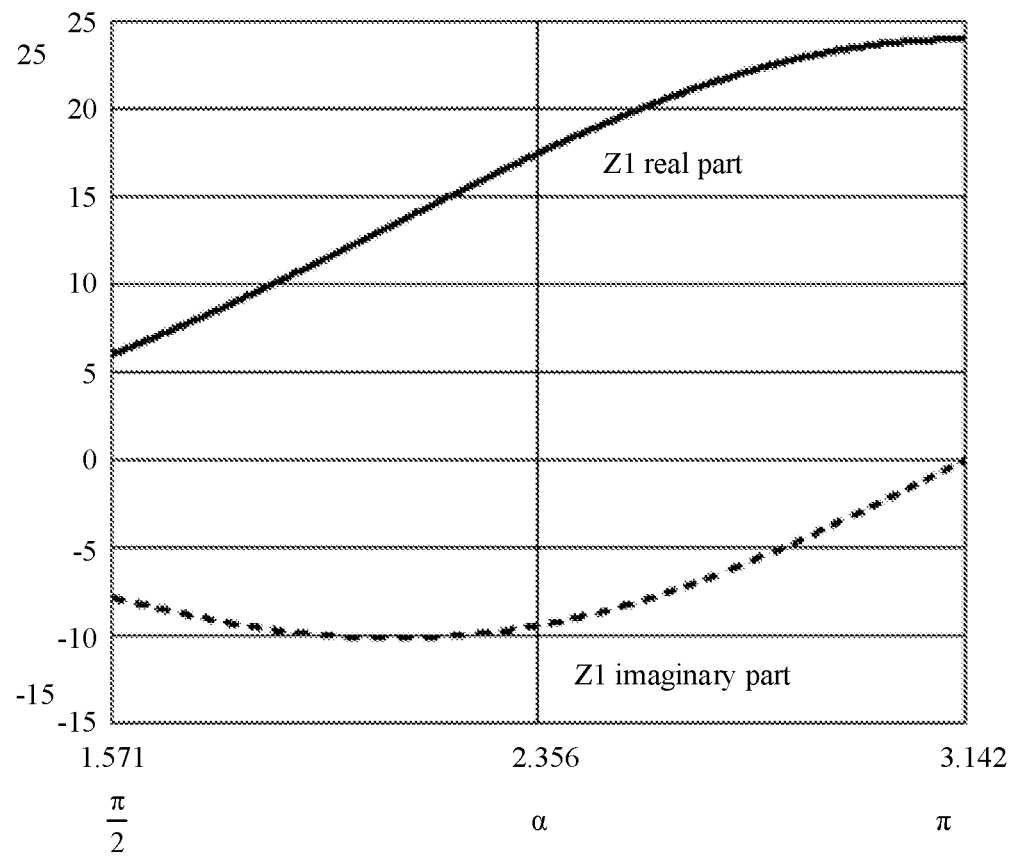
FIG. 11 is a schematic diagram illustrating that a real part and an imaginary part of $Z_l$ vary with a according to an embodiment of this application.

FIG. 11 is a schematic diagram illustrating that a real part and an imaginary part of $Z_l$ vary with α (ranging from π/2 to π).

If the zero-voltage switching is implemented for the controllable switching transistors of the rectifier, the rectifier has a relatively large equivalent imaginary part in an adjustment process. Consequently, optimal system efficiency cannot be achieved.

Therefore, in this embodiment, $L_{2\_comp}$ of the inductance compensation module is increased to weaken the imaginary part of the rectifier, and increase the power factor PF value of $Z_{comp}$.

In addition, when the ZVS effect for controllable switching transistors of an inverter of a transmit end of the wireless charging system is lost, the receive end provided in this embodiment may receive a compensation phase sent by the transmit end. After receiving the compensation phase, the receive end adjusts a from the preset value to the compensation phase, where the compensation phase is obtained by the transmit end based on a result of comparison between a reactive current that is output by the inverter of the transmit end and a preset reactive current. That the transmit end obtains the compensation phase based on the result of comparison between the reactive current that is output by the inverter and the preset reactive current may specifically be: The transmit end obtains the reactive current that is output by the inverter; and compares an absolute value of the reactive current with the preset reactive current because the obtained reactive current is usually a negative number, where the preset reactive current is a preset positive number. The transmit end compares the absolute value of the obtained reactive current with the preset reactive current, and when the absolute value of the reactive current is less than the preset reactive current, the transmit end controls the compensation phase to increase; when the absolute value of the reactive current is greater than the preset reactive current, the transmit end controls the compensation phase to decrease; or when the absolute value of the reactive current is equal to the preset reactive current, the transmit end does not send the compensation phase to the controller of the receive end.

A purpose of adjusting a of the controller by the controller is to adjust reactive power reflected to the transmit end. When the reactive power of the transmit end is changed, the reactive current that is output by the inverter can be changed, so that the ZVS effect is implemented for the controllable switching transistors of the inverter, that is, a ZVS function is restored for the controllable switching transistors of the inverter.

In this manner provided in this embodiment, when the ZVS effect is implemented for the controllable switching transistors of the inverter, a of the receive end is a preset invariable value. The compensation phase transmitted by the transmit end is used as a only when the ZVS effect for the controllable switching transistors of the inverter is lost, so that the ZVS function is restored for the controllable switching transistors of the inverter.

With reference to the accompanying drawings, the following provides descriptions about setting the phase difference to a preset value, and setting the phase-shift angle as a to-be-adjusted object. This embodiment differs from the receive end embodiment 2 only in the to-be-adjusted object, and the rest of content thereof is similar to that in the receive end embodiment 2. Therefore, content that is the same as content in the receive end embodiment 2 is not described herein again.

Figure 12:
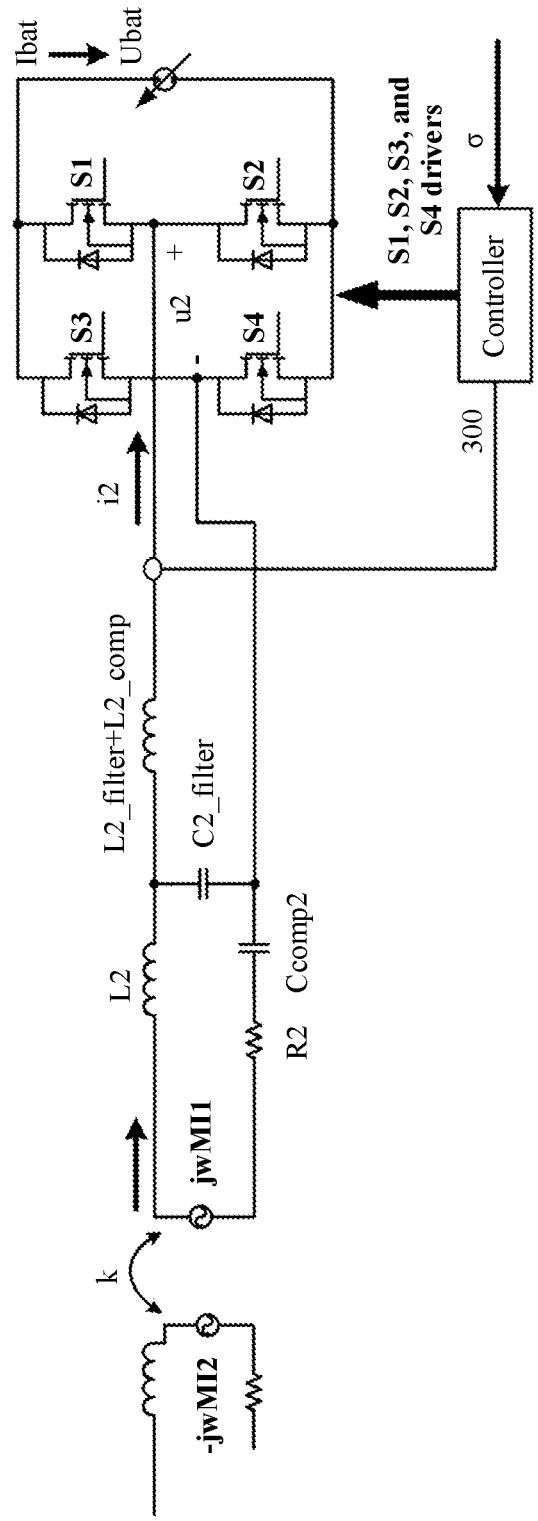
FIG. 12 is a schematic diagram of another receive end of a wireless charging system according to an embodiment of this application.

Receive end embodiment 3:

FIG. 12 is a schematic diagram of another receive end of a wireless charging system according to an embodiment of this application.

In FIG. 6A, FIG. 6B, FIG. 7, and FIG. 12, that an inductive sub-branch and an inductance compensation module are integrated is used as an example for description.

In this embodiment, a controller 300 may specifically control a phase difference between a first bridge arm and a second bridge arm of a rectifier H2 to be a preset phase difference α, where the preset phase difference is used to adjust a resistance of an equivalent impedance of the rectifier. In this embodiment, a is a value preset inside the controller 300, and a is a value received externally by the controller 300. The controller 300 further controls a phase-shift angle β between a bridge arm voltage and a fundamental component of an input current of the rectifier H2 to be π−α+σ, where a is a target value, and the target value a is used to adjust a reactance of the equivalent impedance of the rectifier.

For example, the controller 300 is configured to receive the target value from a system efficiency controller (not shown in the figure). The system efficiency controller is configured to: obtain current system efficiency based on an output power and an input power of the wireless charging system; and if the current system efficiency increases relative to previous system efficiency, keep a previous target value unchanged, and send the previous target value to the controller 300; or if the current system efficiency is lower than previous system efficiency, decrease a previous target value, and send a decreased target value to the controller 300.

The controller 300 may set a according to experiment or experience. For example, the controller 300 sets a to a value that is greater than or equal to 2π/3 and less than or equal to π. For example, α is set to 2π/3.

Because relative locations of the receive end and a transmit end of the wireless charging system are different, when a system parameter changes, a ZVS effect for controllable switching transistors of an inverter of the transmit end is lost. When a transmit end compensation network and a receive end compensation network each use an LCL compensation network, the receive end provided in this embodiment may adjust σ so that both the receive end and the transmit end implement ZVS. This is because reactive power reflected by the receive end to the transmit end changes when the receive end adjusts σ, so that the ZVS is implemented for the inverter of the transmit end.

To make a person skilled in the art better understand the receive end provided in this embodiment of this application, the following details a working principle of the receive end with reference to the accompanying drawings.

Figure 13:
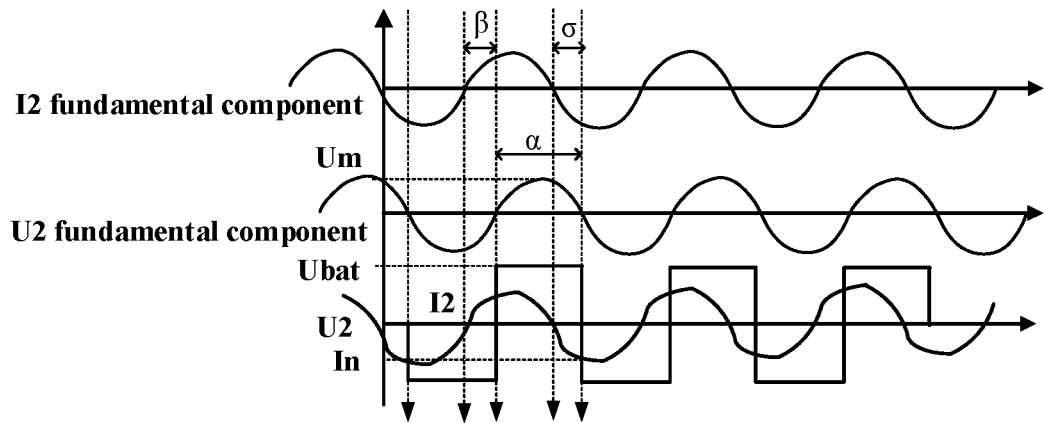
FIG. 13 is a corresponding waveform graph when one a is adjusted according to an embodiment of this application.

FIG. 13 is a corresponding waveform graph when one a is adjusted according to an embodiment of this application.

Drive signals of controllable switching transistors S3 and S4 of the rectifier are complementary, and drive signals of controllable switching transistors S1 and S2 of the rectifier are complementary. A duty cycle of each of the drive signals is 50%.

The bridge arm voltage u2 of the rectifier is phase-locked to the input current i2 of the rectifier, and the receive end compensation network uses an LCL compensation network.

In this embodiment, a may be set to an invariable value within 0 to π. For convenience, it is specified that α=π. Because β is equal to π−α+σ, β=σ.

In this embodiment, σ is an adjustment amount.

As shown in FIG. 13, a phase of a fundamental component U2 lags behind a phase of a fundamental component I2 for a, and an amplitude of the fundamental component of u2 is $$U_m = \frac{2\sqrt{2}}{\pi} U_{bat}.$$

It can be learnt from the formula of $Z_l$ that $Z_l$ is resistive and capacitive, and a value of a real part of $Z_l$ may be adjusted by adjusting a. As a increases, that is, when the value of the real part of $Z_l$ is adjusted, an imaginary part changes. As a result, optimal coil efficiency of the system cannot be achieved by adjusting a to make $Z_1=R_{l\_max}$.

Therefore, the ZVS can be implemented for the controllable switching transistors S3 and S4 on the second bridge arm.

Figure 14:
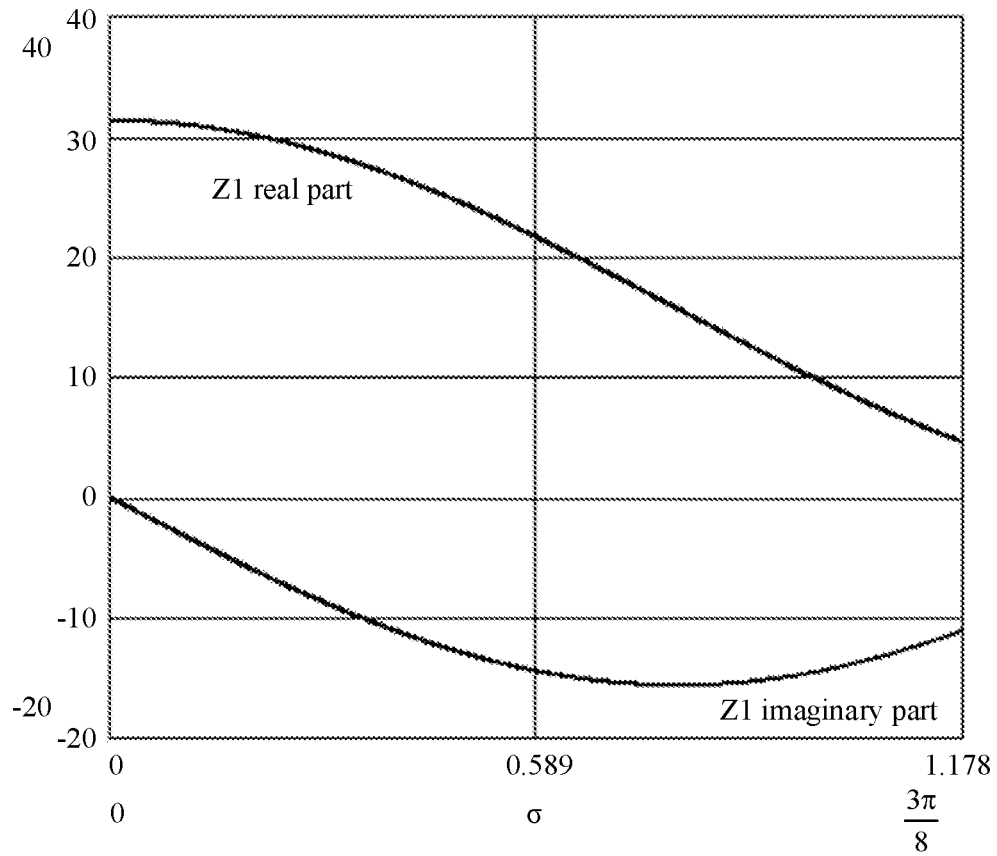
FIG. 14 is a schematic diagram of a real part and an imaginary part of $Z_l$ corresponding to a process of adjusting a according to an embodiment of this application.

FIG. 14 is a schematic diagram of a real part and an imaginary part of $Z_l$ corresponding to a process of adjusting a.

Losses of the switches S3 and S4 are relatively small, and the system can work normally. In this case, when β=σ, a solution for adjusting a can implement ZVS for all the controllable switching transistors of the rectifier. There is a relatively large imaginary part in an adjustment process, and consequently optimal coil efficiency cannot be achieved. The ZVS can be implemented for the rectifier, but a coil loss of the wireless charging system cannot be minimized.

Therefore, in this embodiment of this application, $L_{2\_comp}$ of the inductance compensation module is increased to weaken the imaginary part of the equivalent impedance of the rectifier, and increase a power factor. This improves system efficiency.

To make a person skilled in the art better understand beneficial effects of adding the inductance compensation module in the foregoing embodiments of this application, the following provides detailed descriptions with reference to the accompanying drawings.

Figure 15:
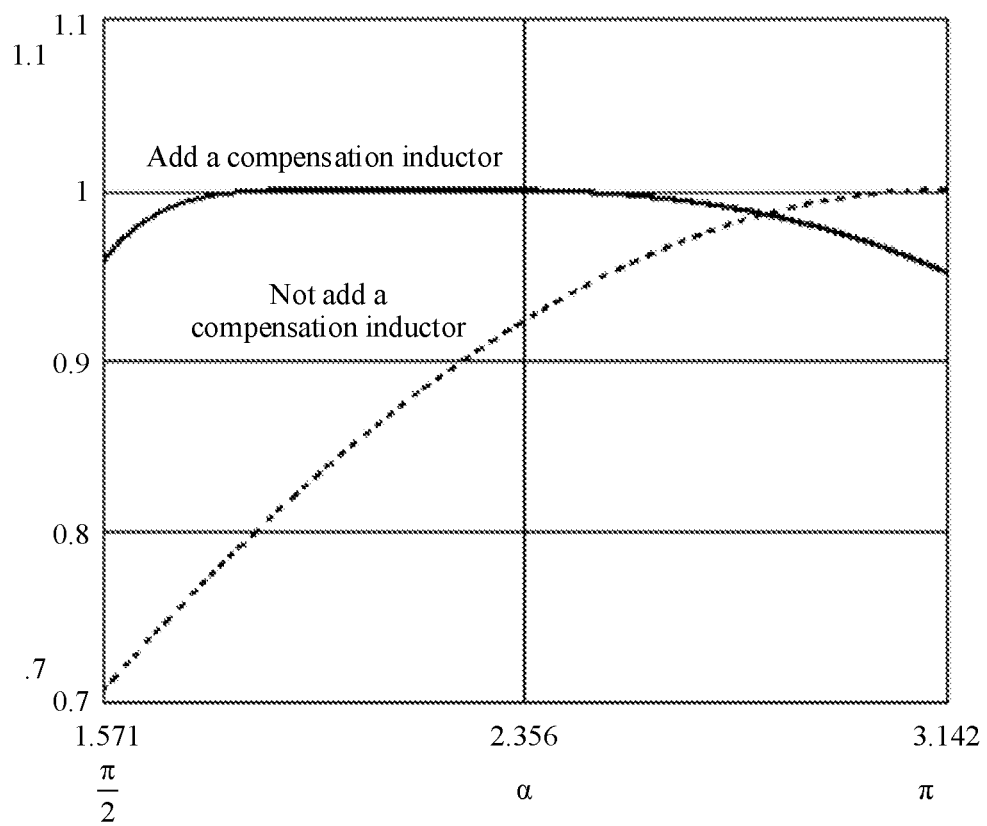
FIG. 15 is a comparison diagram of power factors when there is an inductance compensation module and there is no inductance compensation module according to an embodiment of this application.

FIG. 15 is a comparison diagram of power factors when there is an inductance compensation module and there is no inductance compensation module according to an embodiment of this application.

The receive end provided in the foregoing embodiments of this application can adjust the real part of the equivalent impedance of the rectifier and keep a relatively small imaginary part. In this way, the ZVS effect is ensured for the controllable switching transistors of the rectifier while optimizing system efficiency.

FIG. 15 is a comparison diagram of the power factors PFs when a compensation inductor is added and a compensation inductor is not added. Using the receive end embodiment 2 as an example, a is adjusted and a is a preset invariable value. For power factor PF values of $Z_{comp}$ and $Z_l$ during adjustment of a, it can be learnt from the figure that power factors PFs of $Z_{comp}$ are kept above 0.92 in a whole adjustment range. In this way, the power factors PFs are at a relatively high level.

Figure 16:
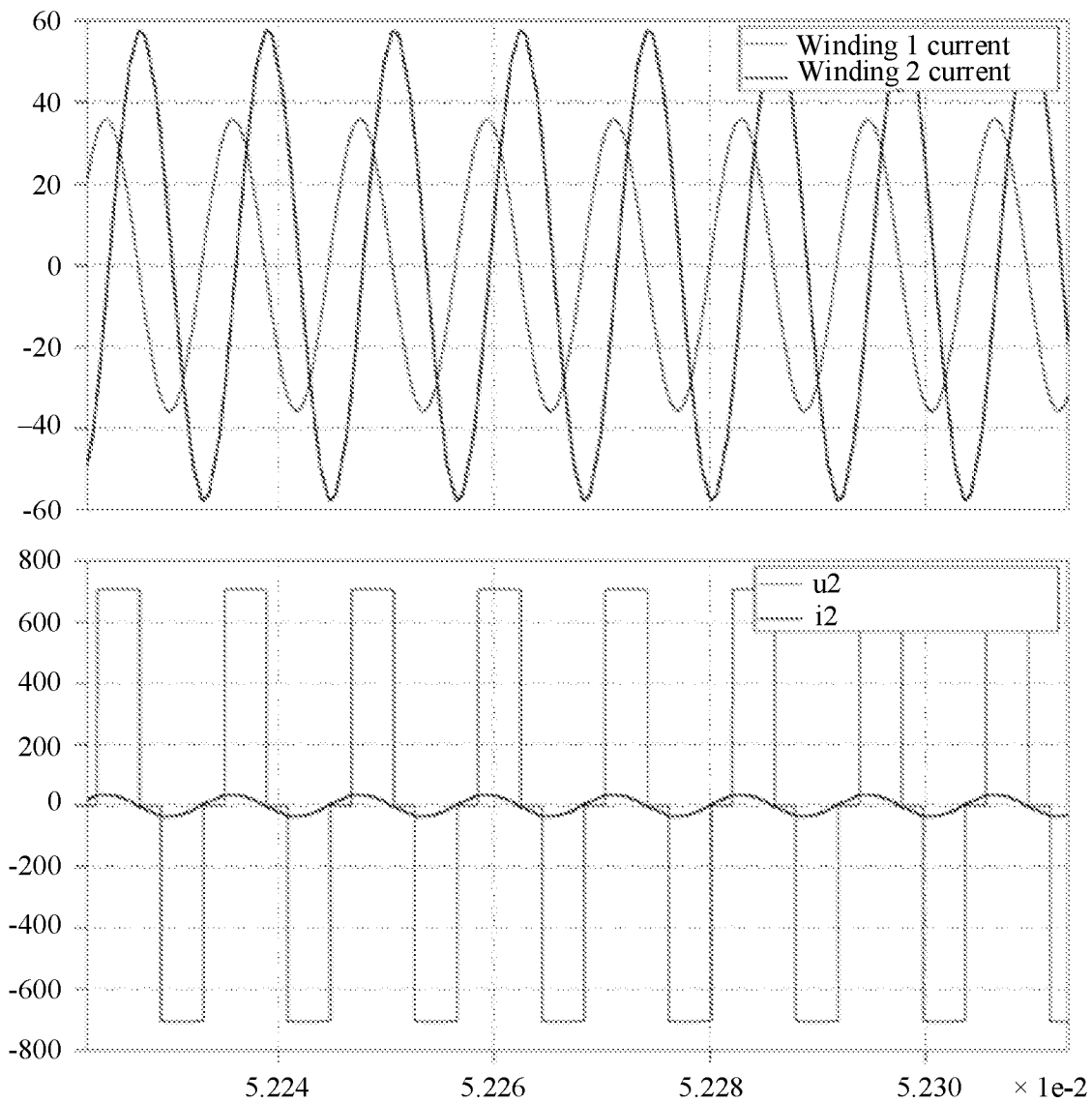
FIG. 16 is a waveform graph of a current of a transmit coil, a current of a receive coil, and a bridge arm voltage and an input current of a rectifier according to an embodiment of this application.

FIG. 16 is a waveform graph of a current of a transmit coil, a current of a receive coil, and a bridge arm voltage and an input current of a rectifier according to an embodiment of this application.

FIG. 16 shows waveforms of the coil currents and the bridge arm voltage u2 and the input current i2 of the rectifier that are obtained after the inductance compensation module is added to the receive end in the foregoing embodiments of this application. It can be learnt from the figure that a phase difference between the current of the transmit coil and the current of the receive coil is 90 degrees. This can ensure relatively large power factor PF values of $Z_{comp}$.

In addition, it can be learnt from waveforms corresponding to u2 and i2 that, I2 is negative at a falling edge in a positive half-cycle of u2. Therefore, a ZVS working status can also be implemented for the controllable switching transistors of the second bridge arm. In this way, the ZVS effect can be implemented for all the controllable switching transistors of the first bridge arm and the second bridge arm of the rectifier.

A principle of taking a value for the inductance of the inductance compensation module described in the receive end embodiment 2 is also applicable to the receive end embodiment 3. Therefore, details are not described herein again.

Based on the receive end of the wireless charging system provided in the foregoing embodiment, an embodiment of this application further provides a receive end control method, where the method is applicable to a controller of the receive end. The following provides detailed descriptions.

Method Embodiment

The receive end control method provided in this embodiment may be used in the receive end described in any one of the foregoing receive end embodiments. The method may include the following steps:

The controller of the receive end may be configured to: adjust a phase difference between a first bridge arm and a second bridge arm of a rectifier, and adjust a phase-shift angle between a bridge arm voltage and a fundamental component of an input current of the rectifier. In this way, ZVS is implemented for controllable switching transistors of the rectifier, and power consumed by the controllable switching transistors of the rectifier is reduced.

That the controller controls the ZVS to be implemented for the controllable switching transistors of the rectifier may specifically include the following two manners.

In a first manner, the phase difference between the two bridge arms of the rectifier is set to a target phase difference, where a is used to adjust a resistance of an equivalent impedance of the rectifier. In other words, drive signals of the controllable switching transistors are adjusted to set the phase difference between the two bridge arms to a target value. In addition, the phase-shift angle β between the bridge arm voltage and the fundamental component of the input current of the rectifier is controlled to be π−α+σ. σ is a preset value, that is, σ is a given value. σ is used to adjust a reactance of the equivalent impedance of the rectifier.

In a second manner, the phase difference between the first bridge arm and the second bridge arm of the rectifier is controlled to be a preset phase difference α, where is used to adjust a resistance of an equivalent impedance of the rectifier. In addition, the phase-shift angle β between the bridge arm voltage and the fundamental component of the alternating current of the rectifier is controlled to be π−α+σ.

σ is a target value, and a is used to adjust a reactance of the equivalent impedance of the rectifier.

In summary, regardless of the first manner or the second manner, the ZVS is implemented for the controllable switching transistors of the rectifier by adjusting the phase difference between the two bridge arms and adjusting the phase difference between the bridge arm voltage and the fundamental component of the input current.

In this embodiment of this application, in addition to the foregoing control method, an inductance compensation module is further added to the receive end. The reason is that, to achieve relatively high system efficiency, a real part and an imaginary part of the equivalent impedance of the rectifier may be adjusted, where the real part is the resistance, and the imaginary part is the reactance. The imaginary part of the equivalent impedance is made as small as possible, and the real part of the equivalent impedance is made as large as possible. However, in a process of making the real part of the equivalent impedance of the rectifier as large as possible, the imaginary part increases inevitably. Therefore, in this embodiment of this application, the inductance compensation module is added to weaken the imaginary part that simultaneously increases, and an inductor in the inductance compensation module is used to weaken reactive power resulting from a capacitive impedance. This further improves efficiency of a wireless charging system.

In addition, in the first adjustment method, a is usually a given invariable value. However, when a ZVS effect for controllable switching transistors of an inverter of a transmit end is lost, the method provided in this embodiment of this application may further include the following steps:

The controller of the receive end receives a compensation phase sent by the transmit end; and makes a equal to the compensation phase, where the compensation phase is obtained by the transmit end based on a result of comparison between a reactive current that is output by the inverter of the transmit end and a preset reactive current.

A purpose of adjusting a of the controller of the receive end by the controller is to adjust the reactive power reflected to the transmit end. When the reactive power of the transmit end is changed, the reactive current that is output by the inverter can be changed, so that the ZVS effect is implemented for the controllable switching transistors of the inverter, that is, a ZVS function is restored for the controllable switching transistors of the inverter.

Electrical Terminal Embodiment

Based on the receive end of the wireless charging system provided in the foregoing embodiment, an embodiment of this application further provides an electrical terminal. The following provides detailed descriptions with reference to the accompanying drawings.

The electrical terminal provided in this embodiment includes a power consuming element, a battery, and the receive end provided in any one of the foregoing embodiments, where the receive end is configured to charge the battery; and
the battery is configured to supply power to the power consuming element.

The electrical terminal may be any terminal including a battery, and the receive end is configured to charge the battery. The receive end and a transmit end transfer electrical energy wirelessly.

For example, the electrical terminal may be an electric automobile. The electric automobile includes a battery, and the battery is configured to provide drive energy for the electric automobile.

Figure 17:
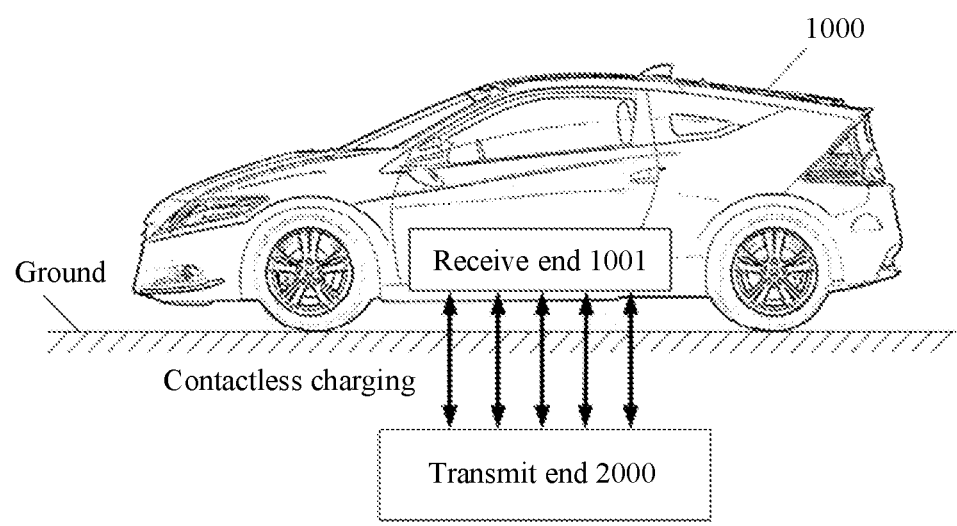
FIG. 17 is a schematic diagram of an electrical terminal being an electric automobile according to an embodiment of this application.

For details, refer to FIG. 17. FIG. 17 is a schematic diagram of an electrical terminal being an electric automobile according to an embodiment of this application.

A receive end 1001 may be located on the electric automobile 1000, and a transmit end 2000 is on the ground, thereby implementing wireless charging for the electric automobile.

Relatively high charging efficiency needs to be ensured in the wireless charging system. Therefore, the received end provided in this embodiment of this application can implement a ZVS effect for a rectifier while ensuring relatively high charging efficiency.

In addition, an embodiment of this application further provides a transmit end corresponding to the receive end provided in the foregoing embodiment. As described in FIG. 1A and FIG. 1B, the transmit end may include an inverter, a transmit end compensation circuit, a transmit coil, and a controller of the transmit end. The inverter is configured to convert, to an alternating current, a direct current that is output by a direct current power supply. The transmit end compensation circuit is configured to: compensate the alternating current, and output a compensated alternating current to the transmit coil. The transmit coil is configured to transmit the alternating current in a form of an alternating magnetic field. FIG. 1A and FIG. 1B do not show the transmit coil and the transmit end compensation circuit, because the transmit coil and the transmit end compensation circuit form the transmit end LCL compensation network in FIG. 1A and FIG. 1B. The controller of the transmit end is configured to send a compensation phase to a controller of the receive end, where the compensation phase is obtained by the controller of the transmit end based on a result of comparison between a reactive current that is output by the inverter of the transmit end and a preset reactive current, so that the controller of the receive end adjusts a reactance of an equivalent impedance of the rectifier based on the compensation phase.

When determining that a ZVS effect for controllable switching transistors of the inverter is lost, the controller of the transmit end may obtain the compensation phase and send the compensation phase to the controller of the receive end, so that the controller of the receive end adjusts reactive power reflected by the receive end to the transmit end. When the reactive power of the transmit end is changed, the reactive current that is output by the inverter can be changed, so that the ZVS effect is implemented for the controllable switching transistors of the inverter, that is, a ZVS function is restored for the controllable switching transistors of the inverter.

Based on the receive end of the wireless charging system and the electrical terminal that are provided in the foregoing embodiments, an embodiment of this application further provides a wireless charging system. The following details the wireless charging system with reference to the accompanying drawings.

Wireless Charging System Embodiment

The wireless charging system provided in this embodiment includes a transmit end and the receive end provided in any one of the foregoing embodiments.

Figure 18:
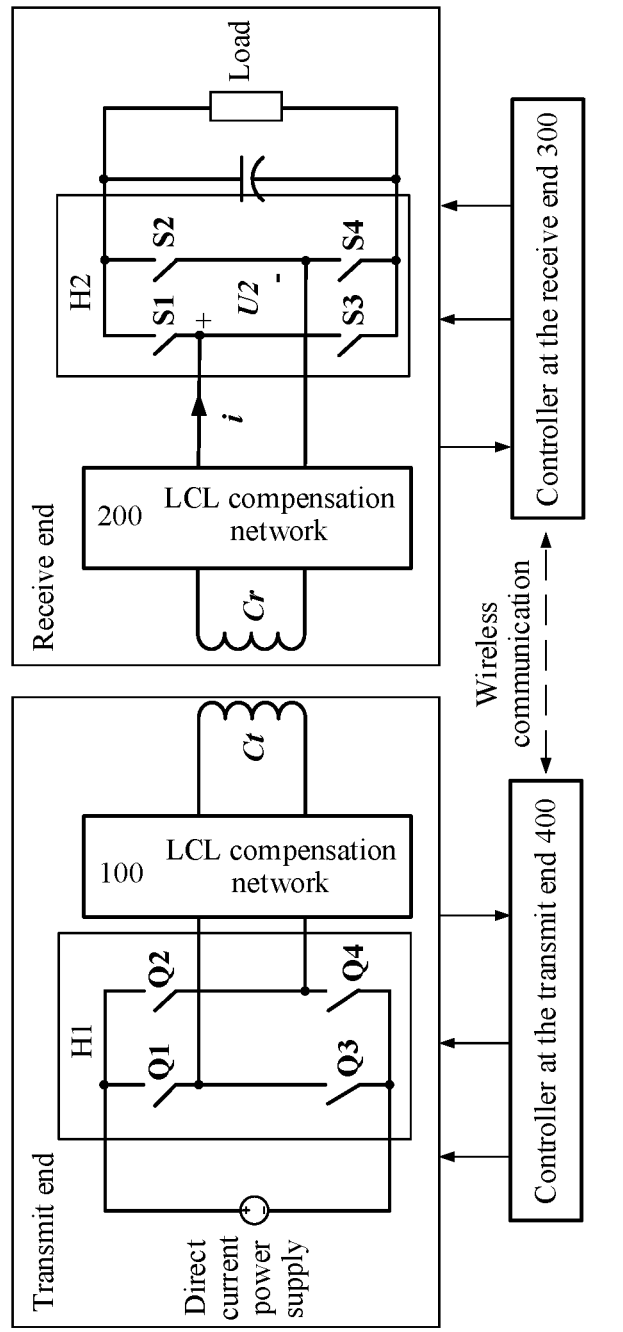
FIG. 18 is a schematic diagram of a wireless charging system according to an embodiment of this application.

For details, refer to FIG. 18. FIG. 18 is a schematic diagram of a wireless charging system according to an embodiment of this application.

For an inverter H1 of the transmit end, the inverter H1 includes controllable switching transistors Q1 to Q4. The transmit end further includes an LCL compensation network 100 and a transmit coil Ct, where the transmit coil Ct is configured to send electromagnetic energy to the receive end.

The receive end includes a receive coil Cr, and further includes an LCL compensation network 200 and a rectifier H2. The rectifier H2 includes controllable switching transistors S1 to S4.

A controller 300 of the receive end communicates with a controller 400 of the transmit end wirelessly.

The wireless charging system provided in this embodiment may be a wireless charging system used by an electric automobile. The receive end is located on the electric automobile, and the transmit end is on the ground. The transmit end charges a battery of the receive end in a wireless charging manner.

It can be understood that the electric automobile may be a hybrid electric vehicle, or may be a battery electric vehicle.

The wireless charging system provided in this embodiment of this application includes the receive end provided in the foregoing embodiment. The receive end can achieve a ZVS effect for the controllable switching transistors of the rectifier. Moreover, an inductance compensation module is added to an input end of the rectifier, to weaken a capacitive part of an equivalent impedance of the rectifier and reduce reactive power of the wireless charging system, thereby improving system efficiency of the wireless charging system.

It should be understood that in this application, "at least one (item)" means one or more, and "a plurality of" means two or more. The term "and/or" describes an association relationship for describing associated objects and represents that three relationships may exist. For example, "A and/or B" may represent the following three cases: Only A exists, only B exists, and both A and B exist. A and B each may be in a singular or plural form. The character "/" generally indicates an "or" relationship between the associated objects. "The following at least one (item)" or a similar expression thereof means any combination of these items, including a singular (item) or any combination of a plural (items). For example, at least one (item) of a, b, or c may represent: a; b; c; "a and b"; "a and c"; "b and c"; or "a, b, and c", where a, b, and c each may be in a singular or plural form.

The foregoing descriptions are merely preferred embodiments of the present invention, but are not intended to limit the present invention in any form. Although the preferred embodiments of the present invention are disclosed above, the embodiments are not intended to limit the present invention. According to the method and the technical content disclosed above, a person skilled in the art can make a plurality of possible changes and modifications on the technical solutions of the present invention, or amend the technical solutions thereof to be embodiments with equal effects through equivalent variations without departing from the protection scope of the technical solutions of the present invention. Therefore, any simple amendments, equivalent variations, and modifications made on the above embodiments according to the technical essence of the present invention without departing from the content of the technical solutions of the present invention shall fall within the protection scope of the technical solutions of the present invention.

What is claimed is:

1. A receive end of a wireless charging system, the receive end comprising a receive coil, a receive end compensation circuit, a rectifier, and a controller, wherein:
   the receive coil is configured to receive an alternating magnetic field and output an alternating current;
   the receive end compensation circuit is connected between the receive coil and the rectifier, wherein the receive end compensation circuit is configured to:
   compensate the alternating current that is output by the receive coil; and
   output a compensated alternating current to the rectifier;
   the receive end compensation circuit and the receive coil form a receive end compensation network, wherein the receive end compensation network comprises a first branch, a second branch, and a third branch, wherein the first branch comprises the receive coil, wherein both the first branch and the second branch are inductive branches, wherein a reactance of the second branch is greater than that of the first branch, wherein the first branch is connected to a first input end of the rectifier through the second branch, wherein the third branch is a capacitive branch, wherein a first end of the third branch is connected to a common end of the first branch and the second branch, and wherein a second end of the third branch is connected to a second input end of the rectifier;
   the rectifier comprises controllable switching transistors, wherein the rectifier is configured to rectify the alternating current to a direct current; and
   the controller is configured to:
   adjust a phase difference between a first bridge arm and a second bridge arm of the rectifier; and
   adjust a phase-shift angle between a bridge arm voltage of the rectifier and a fundamental component of an input current of the rectifier, wherein zero-voltage switching is implemented for the controllable switching transistors of the rectifier.

2. The receive end of the wireless charging system according to claim 1, wherein the controller is configured to:
   control the phase difference between the first bridge arm and the second bridge arm of the rectifier to be a target phase difference α, and
   control the phase-shift angle between the bridge arm voltage of the rectifier and the fundamental component of the input current of the rectifier to be $\pi-\alpha+\sigma$, wherein σ is a target value, wherein α is used to adjust a resistance of an equivalent impedance of the rectifier, and wherein σ is used to adjust a reactance of the equivalent impedance of the rectifier.

3. The receive end of the wireless charging system according to claim 2, wherein σ is obtained from an external instruction, and wherein σ is preset inside the controller.

4. The receive end of the wireless charging system according to claim 2, wherein σ is obtained from an external instruction, and wherein α is preset inside the controller.

5. The receive end of the wireless charging system according to claim 1, wherein the second branch comprises an inductance compensation module and an inductive sub-branch, wherein the first branch, the third branch, and the inductive sub-branch form an inductor-capacitor-inductor (LCL) compensation network, and wherein modulus values of the first branch, the third branch, and the inductive sub-branch are equal; and
    wherein the inductance compensation module is configured to weaken a capacitive part of an equivalent impedance of the rectifier.
6. The receive end of the wireless charging system according to claim 5, wherein the first branch, the inductive sub-branch, and the third branch satisfy the following formula:

$$jX_{L1} = -jX_C = jX_{L2}, \text{ wherein:}$$

$jX_{L1}$ is a reactance of the first branch, $-jX_C$ is a reactance of the third branch, and $jX_{L2}$ is a reactance of the inductive sub-branch.

7. The receive end of the wireless charging system according to claim 5, wherein an inductance $L_{2\_comp}$ of the inductance compensation module is 0.3-3 times as great as a theoretical inductance L, and wherein the theoretical inductance L is obtained according to the following formula:

$$L = \frac{\frac{8}{\pi^2} * \left(\sin\frac{\alpha}{2}\right)^2 * R_{dc} * \cos\left(\frac{\pi-\alpha}{2}+\sigma\right) * \sin\left(\frac{\pi-\alpha}{2}+\sigma\right)}{\omega_s},$$

wherein:
    $\omega_s$ is an angular frequency of the fundamental component of the alternating current of the rectifier, and
    $R_{dc}$ is a load equivalent resistance when the wireless charging system performs output at full power.

8. The receive end of the wireless charging system according to claim 7, wherein when L is calculated, $$\alpha = \frac{2\pi}{3} \text{ and } \sigma = 0.$$

9. The receive end of the wireless charging system according to claim 8, wherein $L_{2\_comp} = L$.

10. The receive end of the wireless charging system according to claim 1, wherein the second branch comprises one inductor.

11. The receive end of the wireless charging system according to claim 1, wherein the second branch comprises two inductors: a first inductor and a second inductor; and
    wherein the first branch is connected to a middle point of the first bridge arm of the rectifier through the first inductor, and wherein the second end of the third branch is connected to a middle point of the second bridge arm of the rectifier through the second inductor.

12. The receive end of the wireless charging system according to claim 11, wherein a reactance of the first inductor is equal to a reactance of the second inductor.

13. The receive end of the wireless charging system according to claim 1, wherein the second branch is used to weaken a capacitive part of the equivalent impedance of the rectifier.

14. The receive end of the wireless charging system according to claim 3, wherein the controller is further configured to:
    receive a compensation phase sent by a transmit end; and
    adjust σ from the target value to the compensation phase after receiving the compensation phase, wherein the compensation phase is obtained by the transmit end based on a result of comparison between a reactive current that is output by an inverter of the transmit end and a preset reactive current.

15. A receive end control method used in a receive end of a wireless charging system, wherein the receive end comprises a receive coil, a receive end compensation circuit, a rectifier, and a controller, wherein:
    the receive coil is configured to receive an alternating magnetic field and output an alternating current;
    the receive end compensation circuit is connected between the receive coil and the rectifier, wherein the receive end compensation circuit is configured to:
        compensate the alternating current that is output by the receive coil; and
        output a compensated alternating current to the rectifier;
    the receive end compensation circuit and the receive coil form a receive end compensation network, wherein the receive end compensation network comprises a first branch, a second branch, and a third branch, wherein the first branch comprises the receive coil, wherein both the first branch and the second branch are inductive branches, wherein a reactance of the second branch is greater than that of the first branch, wherein the first branch is connected to a first input end of the rectifier through the second branch, wherein the third branch is a capacitive branch, wherein a first end of the third branch is connected to a common end of the first branch and the second branch, and wherein a second end of the third branch is connected to a second input end of the rectifier;
    the rectifier comprises controllable switching transistors, wherein the rectifier is configured to rectify the alternating current to a direct current; and
    the control method comprises:
        adjusting a phase difference between a first bridge arm and a second bridge arm of the rectifier; and
        adjusting a phase-shift angle between a bridge arm voltage and a fundamental component of an input current of the rectifier, wherein zero-voltage switching is implemented for the controllable switching transistors of the rectifier.

16. The control method according to claim 15, wherein the adjusting a phase difference between a first bridge arm and a second bridge arm of the rectifier, and adjusting a phase-shift angle between a bridge arm voltage and a fundamental component of an input current of the rectifier comprises:
    controlling the phase difference between the first bridge arm and the second bridge arm of the rectifier to be a target phase difference α; and
    controlling the phase-shift angle between the bridge arm voltage of the rectifier and the fundamental component of the input current of the rectifier to be π−α+σ, wherein σ is a preset value, wherein α is used to adjust a resistance of an equivalent impedance of the rectifier, and wherein σ is used to adjust a reactance of the equivalent impedance of the rectifier.

17. The control method according to claim 16, wherein α is obtained from an external instruction, and wherein σ is preset inside the controller.

18. The control method according to claim 16, wherein σ is obtained from an external instruction, and wherein α is preset inside the controller.

19. The control method according to claim 17, further comprising:
    receiving a compensation phase sent by a transmit end; and making σ equal to the compensation phase, wherein the compensation phase is obtained by the transmit end based on a result of comparison between a reactive current that is output by an inverter of the transmit end and a preset reactive current.

20. A wireless charging system, comprising a transmit end and a receive end, wherein:
- the transmit end comprises an inverter, a transmit end compensation circuit, and a transmit coil, wherein:
  - the inverter is configured to convert, to an alternating current, a direct current that is output by a direct current power supply;
  - the transmit end compensation circuit is configured to: compensate the alternating current, and output a compensated alternating current to the transmit coil;
  - the transmit coil is configured to transmit the alternating current in a form of an alternating magnetic field; and
  - the transmit coil and the transmit coil form a transmit end LCL compensation network; and
- the receive end comprises a receive coil, a receive end compensation circuit, a rectifier, and a controller, wherein:
  - the receive coil is configured to receive an alternating magnetic field and output an alternating current;
  - the receive end compensation circuit is connected between the receive coil and the rectifier, wherein the receive end compensation circuit is configured to: compensate the alternating current that is output by the receive coil; and output a compensated alternating current to the rectifier;
  - the receive end compensation circuit and the receive coil form a receive end compensation network, wherein the receive end compensation network comprises a first branch, a second branch, and a third branch, wherein the first branch comprises the receive coil, wherein both the first branch and the second branch are inductive branches, wherein a reactance of the second branch is greater than that of the first branch, wherein the first branch is connected to a first input end of the rectifier through the second branch, wherein the third branch is a capacitive branch, wherein a first end of the third branch is connected to a common end of the first branch and the second branch, and wherein a second end of the third branch is connected to a second input end of the rectifier;
  - the rectifier comprises controllable switching transistors, wherein the rectifier is configured to rectify the alternating current to a direct current; and
  - the controller is configured to:
    - adjust a phase difference between a first bridge arm and a second bridge arm of the rectifier; and
    - adjust a phase-shift angle between a bridge arm voltage of the rectifier and a fundamental component of an input current of the rectifier, wherein zero-voltage switching is implemented for the controllable switching transistors of the rectifier.

\* \* \* \* \*

UNITED STATES PATENT AND TRADEMARK OFFICE
CERTIFICATE OF CORRECTION

PATENT NO. : 11,901,760 B2
APPLICATION NO. : 17/226860
DATED : February 13, 2024
INVENTOR(S) : Yunhe Mao and Yanding Liu It is certified that error appears in the above-identified patent and that said Letters Patent is hereby corrected as shown below:

In the Claims

Column 26, Line 58, Claim 3, please delete "σ" and insert therefore -- α --;

Column 29, Line 19, Claim 20, before "form" please delete "and the transmit coil".

Signed and Sealed this
Seventh Day of May, 2024

Katherine Kelly Vidal
*Director of the United States Patent and Trademark Office*